(12) United States Patent
Kobayashi

(10) Patent No.: US 10,846,036 B2
(45) Date of Patent: Nov. 24, 2020

(54) INFORMATION PROCESSING DEVICE, METHOD, AND SYSTEM FOR CONTROLLING AN OUTPUT DEVICE AND RECORDING AND DISPLAYING OUTPUT SETTINGS

(71) Applicant: RICOH COMPANY, LTD., Tokyo (JP)

(72) Inventor: Hiroto Kobayashi, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/507,489

(22) Filed: Jul. 10, 2019

(65) Prior Publication Data

US 2019/0377527 A1    Dec. 12, 2019

Related U.S. Application Data

(63) Continuation of application No. 15/776,105, filed as application No. PCT/JP2016/084317 on Nov. 18, 2016, now Pat. No. 10,394,503.

(30) Foreign Application Priority Data

Nov. 19, 2015 (JP) ................................ 2015-226780
Oct. 3, 2016 (JP) ................................ 2016-195707

(51) Int. Cl.
  *G06F 3/12*    (2006.01)
  *H04N 1/00*    (2006.01)
  *G06F 3/0481*  (2013.01)

(52) U.S. Cl.
  CPC .......... *G06F 3/1257* (2013.01); *G06F 3/1204* (2013.01); *G06F 3/1285* (2013.01);

(Continued)

(58) Field of Classification Search
  CPC .... G06F 3/1257; G06F 3/1204; G06F 3/1285; G06F 3/04817; H04N 1/00; H04N 1/00411

(Continued)

(56) References Cited

U.S. PATENT DOCUMENTS 8,953,180 B2    2/2015  Ebuchi et al.
9,104,350 B2    8/2015  Ebuchi et al.

(Continued)

FOREIGN PATENT DOCUMENTS

AT    2002-182871      6/2002
CN    101547195 A      9/2009

(Continued)

OTHER PUBLICATIONS

International Search Report dated Jan. 24, 2017 in PCT/JP2016/084317 filed Nov. 18, 2016.

(Continued)

*Primary Examiner* — Gabriel I Garcia
(74) *Attorney, Agent, or Firm* — Oblon, McClelland, Maier & Neustadt, L.L.P.

(57) ABSTRACT

An information processing device for controlling an output device capable of communication, the information processing device includes: circuitry configured to: receive an output setting of the output device including a combination of set values for a plurality of setting items; record, in response to determination of the output setting, the determined output setting including the combination of the set values for the setting items in a storage area; and present one or more output settings acquired from the storage area as a candidate to be reused.

16 Claims, 20 Drawing Sheets

(52) U.S. Cl.
CPC .......... *H04N 1/00* (2013.01); *H04N 1/00411* (2013.01); *G06F 3/04817* (2013.01)

(58) Field of Classification Search
USPC ................................................ 358/1.1–1.18
See application file for complete search history.

(56) References Cited

U.S. PATENT DOCUMENTS

| | | |
|---|---|---|
| 9,740,370 B2 | 8/2017 | Shin et al. |
| 2002/0080376 A1 | 6/2002 | Momose et al. |
| 2006/0262338 A1 | 11/2006 | Momose et al. |
| 2008/0068636 A1 | 3/2008 | Momose et al. |
| 2010/0118321 A1 | 5/2010 | Ebuchi et al. |
| 2010/0195153 A1 | 8/2010 | Momose et al. |
| 2010/0302589 A1 | 12/2010 | Kobayashi |
| 2011/0058199 A1 | 3/2011 | Kobayashi |
| 2011/0286036 A1 | 11/2011 | Kobayashi |
| 2011/0310409 A1 | 12/2011 | Yukumoto |
| 2012/0140269 A1 | 6/2012 | Kobayashi |
| 2013/0044335 A1 | 2/2013 | Kobayashi |
| 2013/0044354 A1 | 2/2013 | Momose et al. |
| 2013/0094056 A1 | 4/2013 | Kobayashi |
| 2013/0242332 A1 | 9/2013 | Momose et al. |
| 2013/0250331 A1 | 9/2013 | Kobayashi |
| 2014/0055799 A1 | 2/2014 | Nakagawa |
| 2014/0063522 A1 | 3/2014 | Kobayashi |
| 2014/0146338 A1 | 5/2014 | Momose et al. |
| 2014/0331164 A1* | 11/2014 | Enomoto ........... H04N 1/00307 715/771 |
| 2015/0036192 A1 | 2/2015 | Momose et al. |
| 2015/0052480 A1 | 2/2015 | Shin et al. |
| 2015/0070728 A1 | 3/2015 | Ebuchi et al. |
| 2015/0254026 A1 | 9/2015 | Kobayashi et al. |
| 2016/0077777 A1 | 3/2016 | Kobayashi et al. |
| 2016/0100068 A1 | 4/2016 | Momose et al. |
| 2017/0242634 A1 | 8/2017 | Momose et al. |

FOREIGN PATENT DOCUMENTS

| | | |
|---|---|---|
| CN | 103631543 A | 3/2014 |
| CN | 104135585 A | 11/2014 |
| JP | 2007-041808 | 2/2007 |
| JP | 2012-053654 | 3/2012 |
| JP | 2014-124775 | 7/2014 |
| JP | 2014-137770 | 7/2014 |
| JP | 2014-179028 | 9/2014 |

OTHER PUBLICATIONS

International Preliminary Examination Report dated May 30, 2017 in PCT/JP2016/084317 filed Nov. 18, 2016.
Written Opinion of the International Searching Authority dated Jan. 24, 2017 in PCT/JP2016/084317 filed Nov. 18, 2016.
Extended European Search Report dated Aug. 28, 2018 in European Patent Application No. 16866460.5, 9 pages.
Office Action dated Aug. 27, 2020, in corresponding Chinese Patent Application No. 201680067363.4, 12 pages.

* cited by examiner

[Fig. 8A]

| ICON NAME: DUPLEX<br>DUPLEX PRINTING: LONG-SIDE BINDING | ICON NAME: INTENSIVE<br>INTENSIVE PRINTING: 2in1 |
|---|---|
| ICON NAME: INTENSIVE (DUPLEX)<br>DUPLEX PRINTING: LONG-SIDE BINDING<br>INTENSIVE PRINTING: 2in1 | ICON NAME: BLACK AND WHITE (DUPLEX)<br>DUPLEX PRINTING: LONG-SIDE BINDING<br>COLOR PRINTING: BLACK AND WHITE |

[Fig. 8B]

```
ICON NAME: DUPLEX
PRINTING METHOD: NORMAL
DOCUMENT SIZE: A4
DOCUMENT DIRECTION: VERTICAL
SHEET FEEDING TRAY: AUTOMATIC
SHEET TYPE: PLAIN PAPER
COLOR PRINTING: COLOR
NUMBER OF COPIES: 1
DUPLEX PRINTING: LONG-SIDE
BINDING
INTENSIVE PRINTING: NO
...
```

```
ICON NAME: INTENSIVE
PRINTING METHOD: NORMAL
DOCUMENT SIZE: A4
DOCUMENT DIRECTION: VERTICAL
SHEET FEEDING TRAY: AUTOMATIC
SHEET TYPE: PLAIN PAPER
COLOR PRINTING: COLOR
NUMBER OF COPIES: 1
DUPLEX PRINTING: NO
INTENSIVE PRINTING: 2in1
...
```

```
ICON NAME: INTENSIVE (DUPLEX)
PRINTING METHOD: NORMAL
DOCUMENT SIZE: A4
DOCUMENT DIRECTION: VERTICAL
SHEET FEEDING TRAY: AUTOMATIC
SHEET TYPE: PLAIN PAPER
COLOR PRINTING: COLOR
NUMBER OF COPIES: 1
DUPLEX PRINTING: LONG-SIDE
BINDING
INTENSIVE PRINTING: 2in1
...
```

```
ICON NAME: BLACK AND WHITE
(DUPLEX)
PRINTING METHOD: NORMAL
DOCUMENT SIZE: A4
DOCUMENT DIRECTION: VERTICAL
SHEET FEEDING TRAY: AUTOMATIC
SHEET TYPE: PLAIN PAPER
COLOR PRINTING: BLACK AND
WHITE
NUMBER OF COPIES: 1
DUPLEX PRINTING: LONG-SIDE
BINDING
INTENSIVE PRINTING: NO
...
```

Fig. 8C

| DRIVER NAME | USER NAME | APPLICATION NAME | DOCUMENT NAME | DATE AND TIME OF PRINTING | NUMBER OF TIMES | SETTING ITEM |
|---|---|---|---|---|---|---|
| PCL6UD | USER1 | MEMO PAD | DOCUMENT1.TXT | 20xx/xx/xx xx:xx | 1 | 2in1, TONER SAVING On... |
| PSUD | USER2 | DOCUMENT | DOCUMENT2.ODF | 20xx/xx/xx xx:xx | 2 | BLACK AND WHITE, 4in1... |
| PSUD | USER3 | DOCUMENT | DOCUMENT3.ODF | 20xx/xx/xx xx:xx | 1 | DUPLEX SHORT-SIDE BINDING StapleOn... |

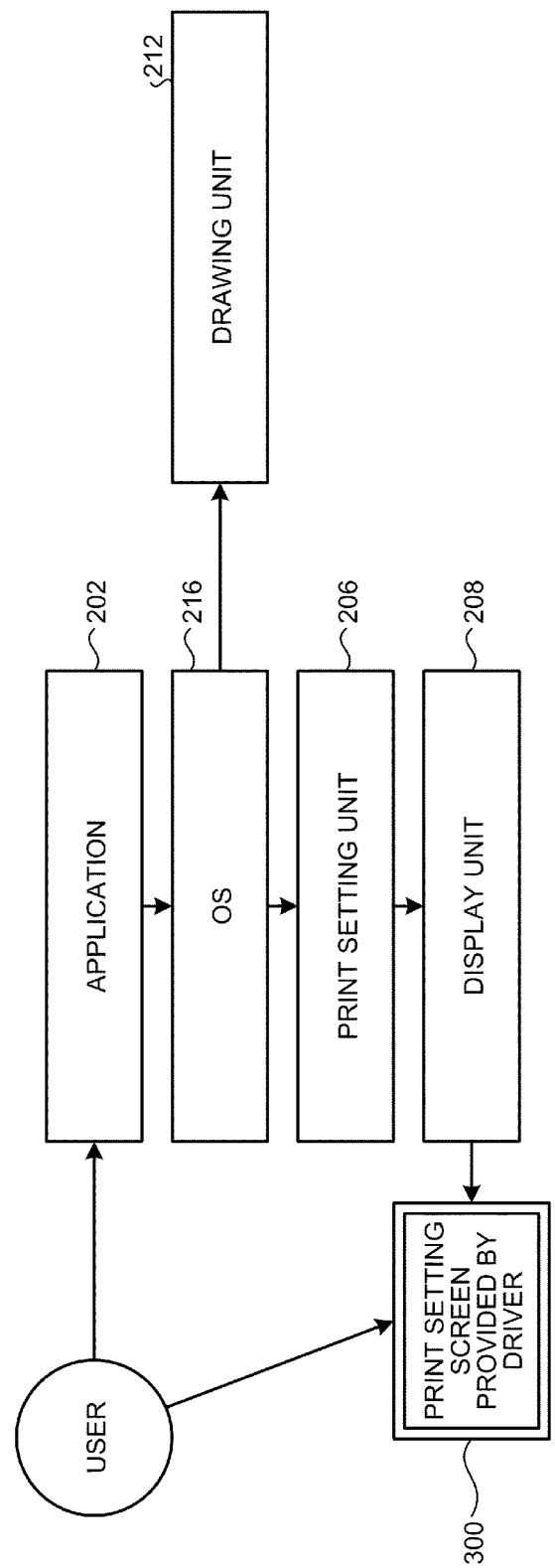

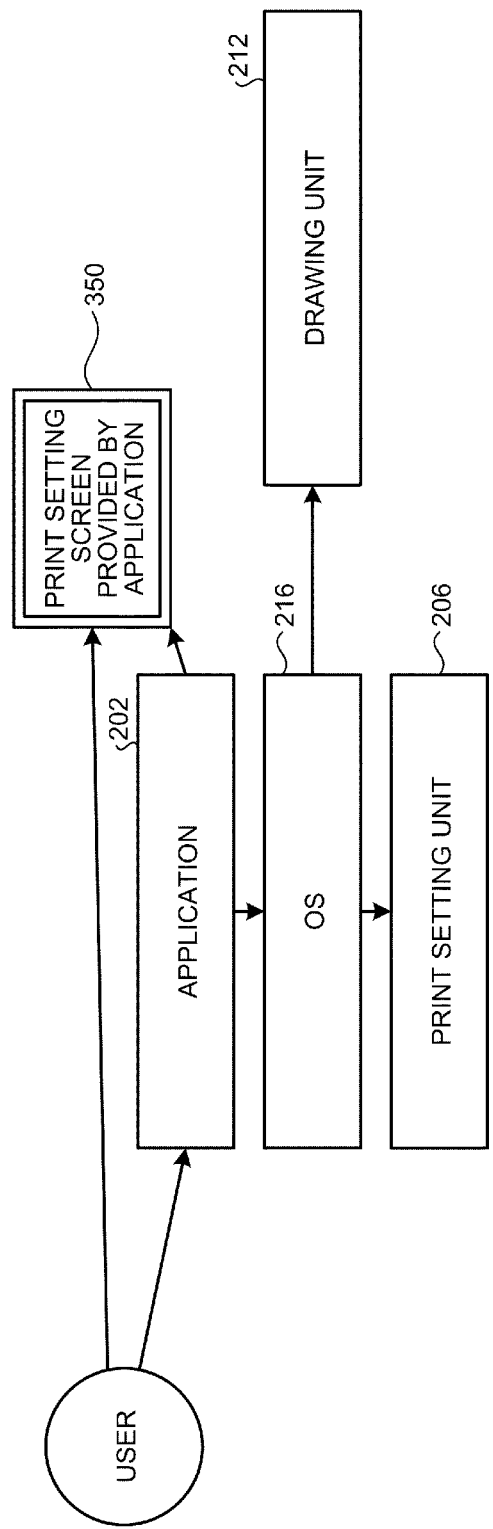

[Fig. 13A]
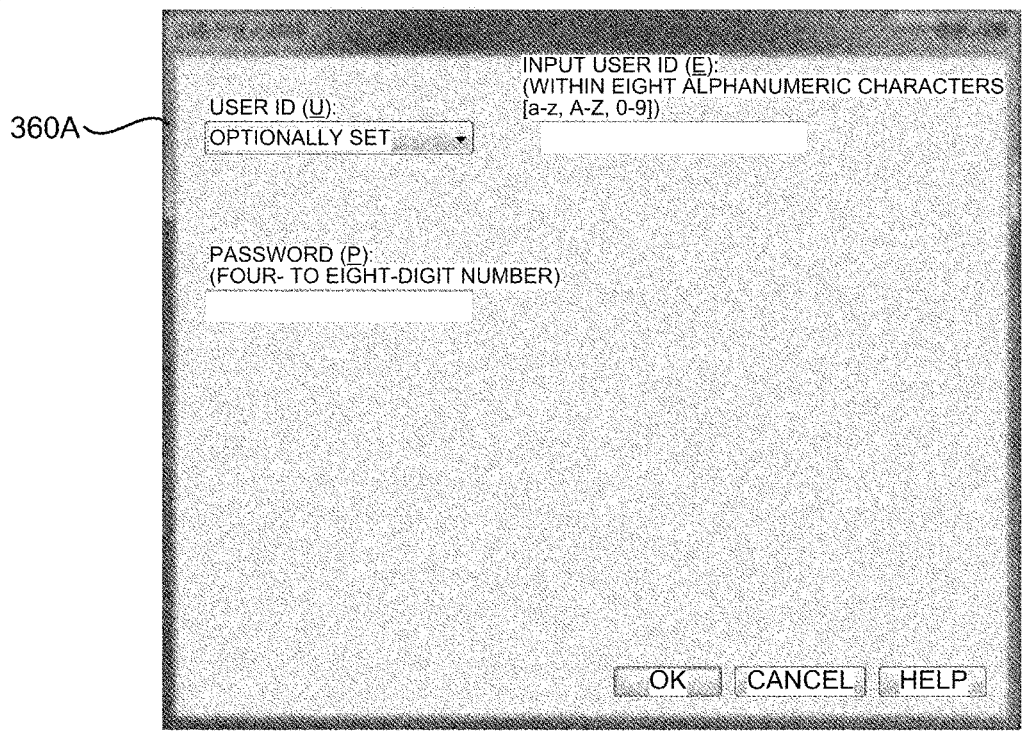
[Fig. 13B]
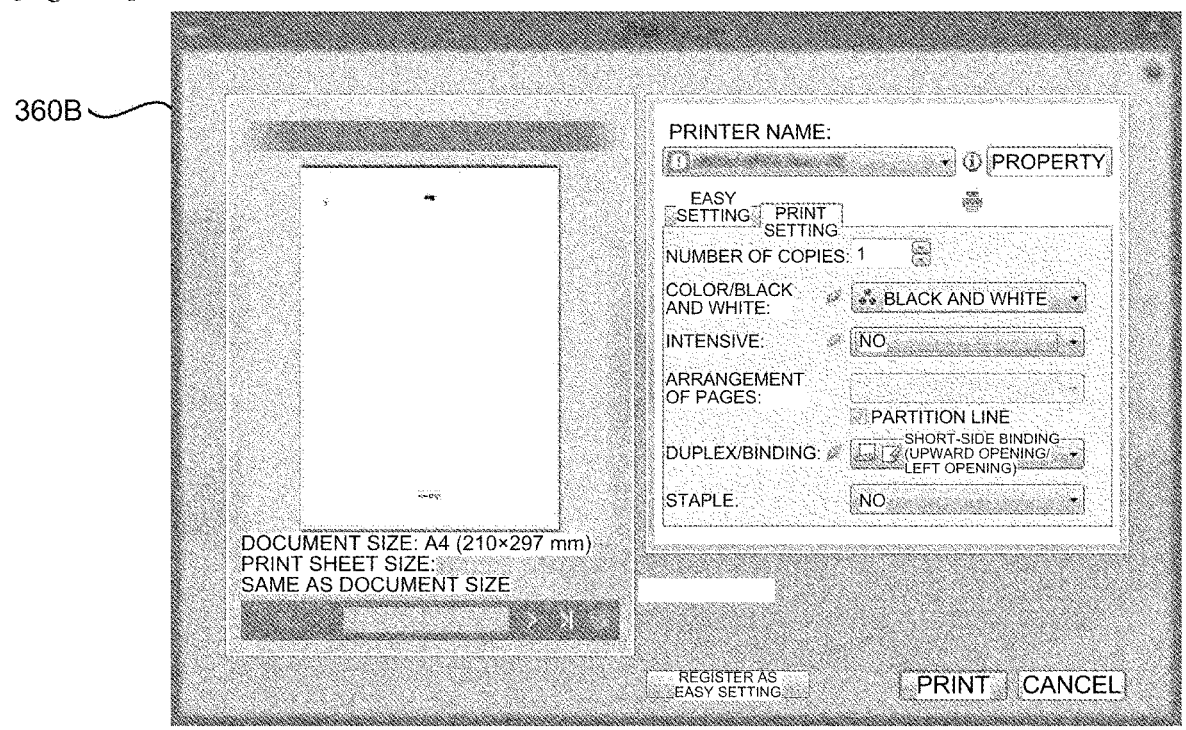

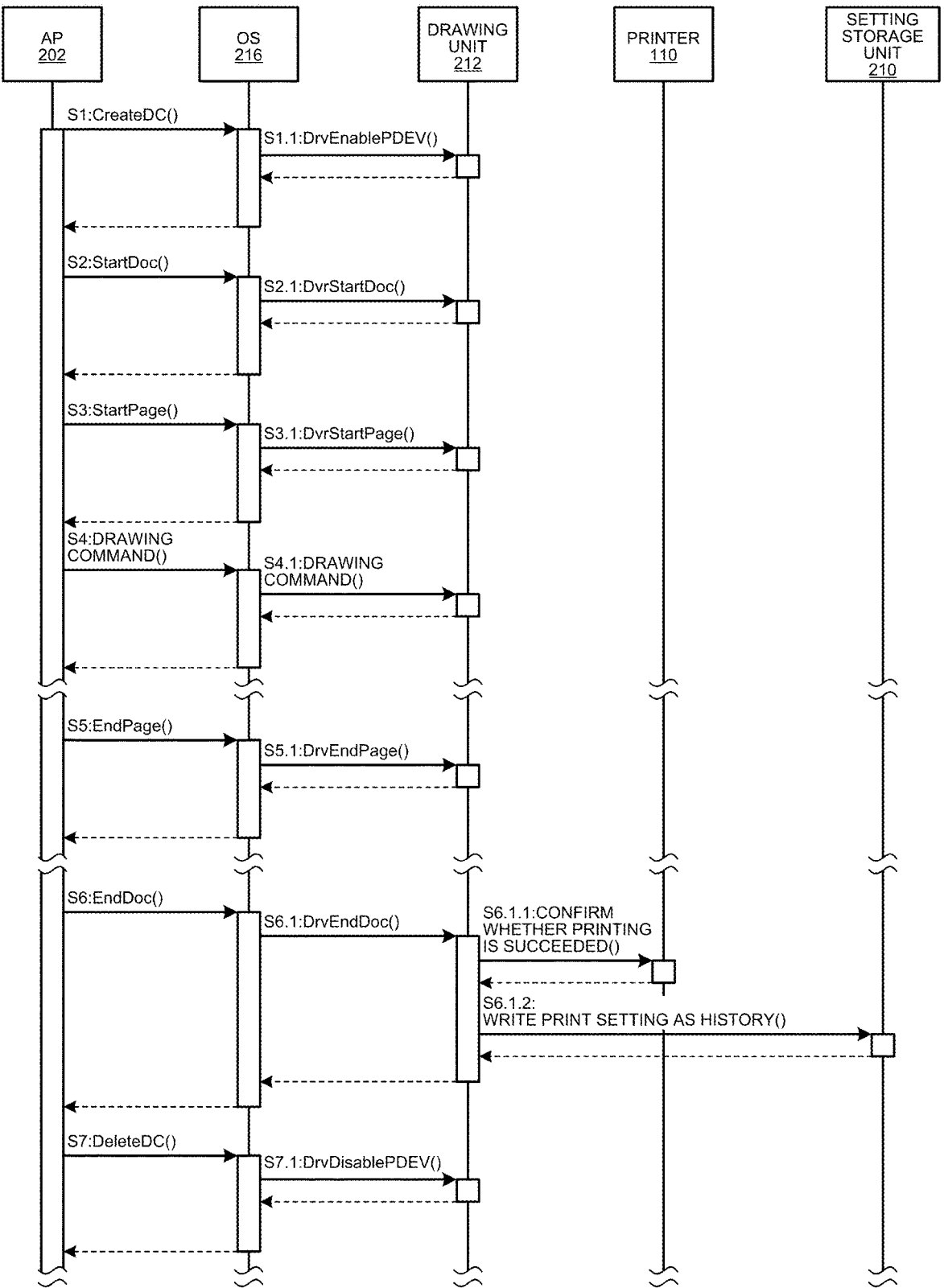

INFORMATION PROCESSING DEVICE, METHOD, AND SYSTEM FOR CONTROLLING AN OUTPUT DEVICE AND RECORDING AND DISPLAYING OUTPUT SETTINGS

CROSS-REFERENCE TO RELATED APPLICATIONS

This application is a continuation application of U.S. application Ser. No. 15/776,105, filed May 15, 2018, which is a National Stage Application of PCT Application NO. PCT/JP2016/084317, filed Nov. 18, 2016, which is based upon and claims the benefit of priority from Japanese Patent Application No. 2015-226780, filed Nov. 19, 2015, and the Japanese Patent Application No. 2016-195707, filed Oct. 3, 2016. The entire contents of the above-identified applications are incorporated herein by references.

TECHNICAL FIELD

The present invention relates to an information processing device, a setting method, and an information processing system.

BACKGROUND ART

In the related art, regarding an output setting screen of a computer program for controlling an output device, there is known a function of calling a set of set values for a plurality of setting items registered in advance (which is called favorites, a shortcut icon, a one-click icon, and the like). For example, a printer driver provides a user interface such as a print setting screen, and accepts various setting changes from a user. In the printer driver, there are a large number of setting items, and the number of prohibitions among the setting items is large, so that it is difficult for the user to determine the set value of the setting item. Thus, there are known printer drivers providing a setting set in which some set values of print setting items are changed.

For example, Japanese Patent Application Laid-open No. 2002-182871 (Patent Literature 1) discloses a configuration of displaying, in an icon display region, a list of one-click icons each representing one or a plurality of printing functions to easily perform setting of the printing function of the printer.

Among the various setting items, there are some setting items of which the settings can be changed a little for each time of output processing. Such setting items for the printer driver include, for example, setting items related to printing quality such as monochrome printing, toner saving, and color balance. Whether to register, as a different setting set, the settings that are changed a little for each time of output processing depends on the user. At a later date, however, demand is frequently caused for reusing the settings that has been used in the past. However, the set value of the setting item is held only during the output processing, and cannot be reused at a later date.

SUMMARY OF INVENTION

Technical Problem

In view of the related art described above, there is a need to provide an information processing device for reusing an output setting based on a record of the output setting that has been used, regarding the output setting of an output device that can communicate with a computer.

Solution to Problem

According to exemplary embodiments of the present invention, there is provided an information processing device for controlling an output device capable of communication, the information processing device comprising: circuitry configured to: receive an output setting of the output device including a combination of set values for a plurality of setting items; record, in response to determination of the output setting, the determined output setting including the combination of the set values for the setting items in a storage area; and present one or more output settings acquired from the storage area as a candidate to be reused.

Advantageous Effects of Invention

With the above configuration, regarding the output setting of the output device that can communicate with the computer, the output setting can be reused based on the record of the output setting that has been used.

BRIEF DESCRIPTION OF DRAWINGS

FIG. 8A is a diagram exemplifying a data structure of one-click icon information stored in a one-click icon information storage unit.

FIG. 8B is a diagram exemplifying a data structure of one-click icon information stored in a one-click icon information storage unit.

FIG. 8C is a diagram exemplifying setting history information stored in a setting history information storage unit.

FIG. 11A is a diagram illustrating a procedure of print setting in a case of using the print setting screen provided by the printer driver.

FIG. 11B is a diagram illustrating a procedure of print setting in a case of using the print setting screen provided by an application.

FIG. 13A is a diagram for explaining a case in which the print setting may be changed based on user conversation after a print command is issued.

FIG. 13B is a diagram for explaining a case in which the print setting may be changed based on user conversation after a print command is issued.

FIG. 14 is a sequence diagram illustrating processing of recording a print setting history for recording, as a history, a print setting with which printing is successfully performed by a drawing unit in the second embodiment.

DESCRIPTION OF EMBODIMENTS

The following describes an embodiment, but the embodiment is not limited thereto. In the following description, as an information processing device, exemplified are a computer device that causes the printer driver to be operated.

Figure 1:
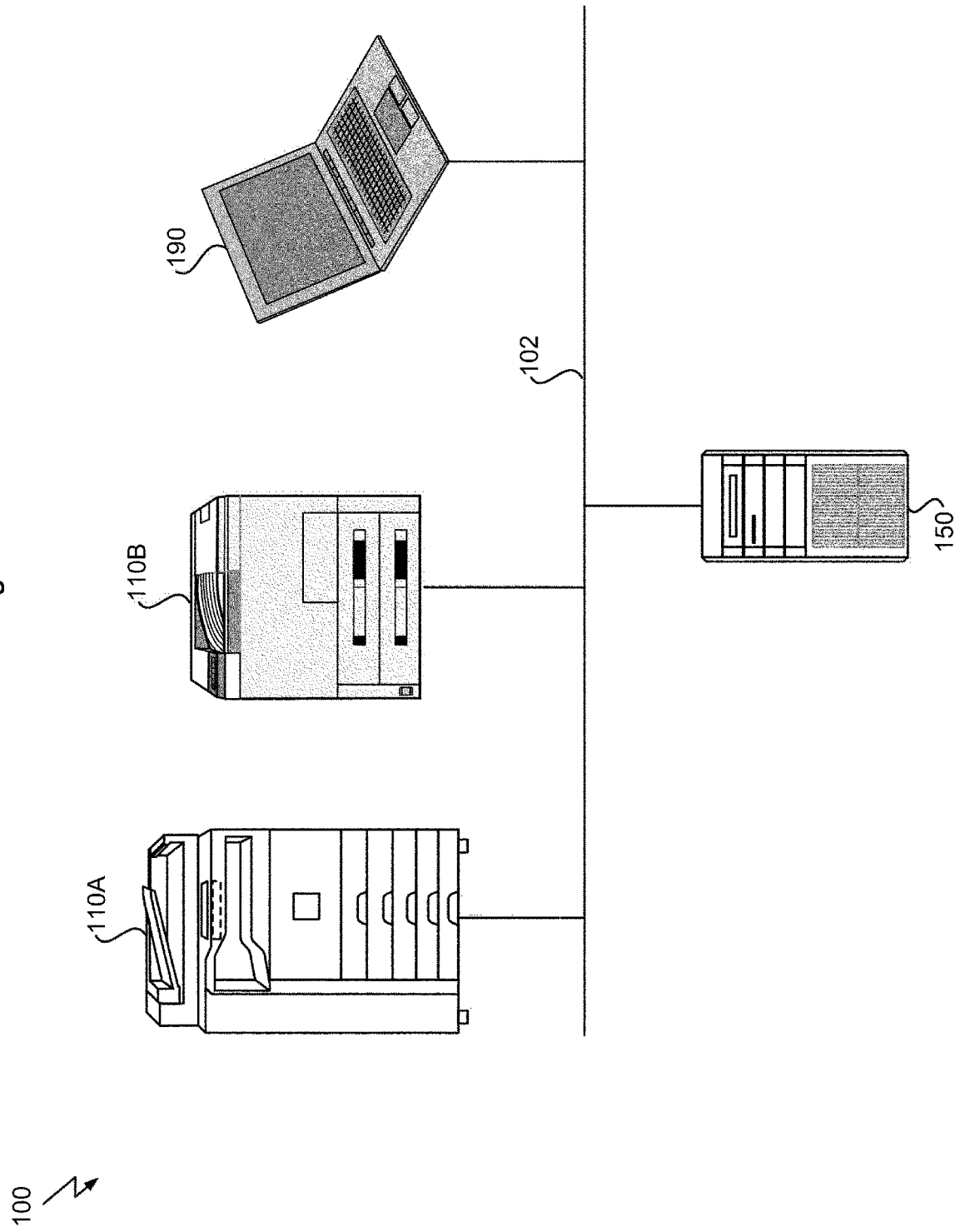
FIG. 1 is a schematic configuration diagram illustrating a printing system according to an embodiment.

FIG. 1 is a diagram illustrating a schematic configuration of a printing system 100 according to the embodiment. As illustrated in FIG. 1, the printing system 100 includes an image forming apparatus 110, a server device 150, and a client device 190 connected to each other via a network 102. As the image forming apparatus 110, a device having an output function can be exemplified such as a multifunction peripheral 110A and a laser printer 110B. The server device 150 and the client device 190 are configured as a general purpose computer such as a personal computer and a workstation, a portable information terminal such as a tablet computer and a smartphone, and the like. For example, the network 102 is configured as a wired or wireless local area network (LAN) using a transmission control protocol/internet protocol (TCP/IP) stack.

The server device 150 and the client device 190 cause the printer driver according to the embodiment to be operated, and transmits a print request along with print data to the image forming apparatus 110 via the network 102. The server device 150 is not specifically limited, and is managed by an administrator on a user side of the image forming apparatus 110, for example. The client device 190 is not specifically limited, and is used by an end user of the image forming apparatus 110. The image forming apparatus 110 is a peripheral that performs image forming processing based on the received print data in response to the print request from the server device 150 and the client device 190 via the network 102.

In the printing system 100 illustrated in FIG. 1, the server device 150 operates as a host of the image forming apparatus 110, and the client device 190 issues the print request to the image forming apparatus 110 via the server device 150. According to a specific embodiment using Windows (registered trademark) and the like, typically, the printer driver is downloaded from the server device 150 to the client device 190 using the Point & Print technology, and the printer driver can be installed in the client device 190. However, the environment illustrated in FIG. 1 is merely an example, and is not specifically limited. According to another embodiment, the image forming apparatus 110 and the client device 190 may be directly connected to each other via the network 102. According to a further embodiment, the image forming apparatus 110 may be connected to the server device 150 or to the client device 190 via a bus such as a universal serial bus (USB) in place of a LAN and the like, for example.

The Point & Print technology is a technology provided in the Windows (registered trademark) environment. With this technology, in a system in which a printer, a host, and a client are connected to a network, the client downloads a printer driver from the host to be installed, and can easily cause the printer to perform printing using the host as a print server.

The printer driver that is installed using the Point & Print technology can change a computer device that performs drawing processing. To perform drawing processing on the client side is called client side rendering, and to perform drawing processing on the host side is called server side rendering. In such an environment, a print setting change for each job is performed on the client side. On the other hand, a change of a default print setting is performed on the host side, and the setting change performed on the host side is synchronized with each client.

Figure 2:
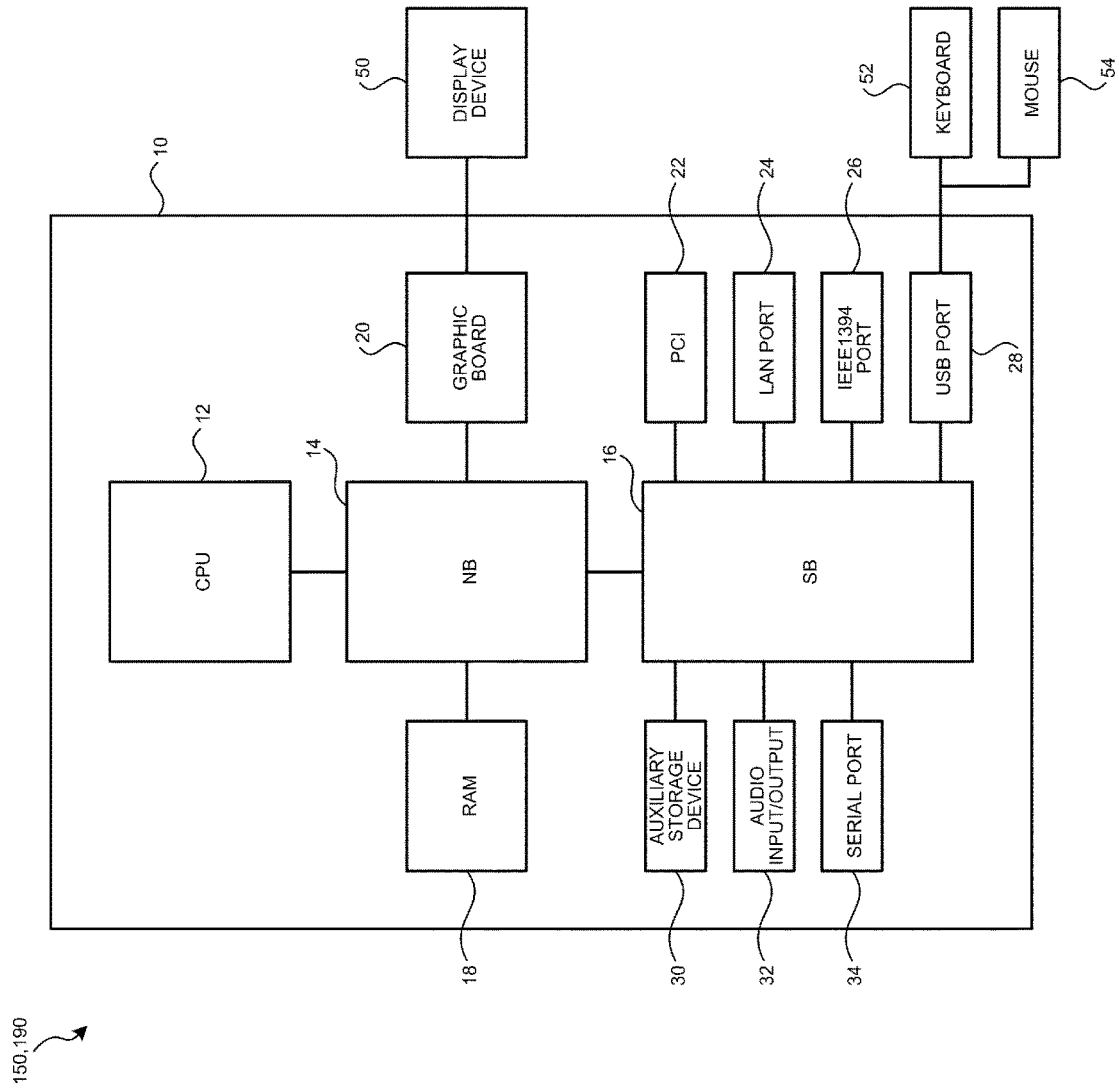
FIG. 2 is a hardware configuration diagram of a server device and a client device according to the embodiment.

The following describes a hardware configuration of the server device 150 and the client device 190 according to the embodiment with reference to FIG. 2. Typically, the server device 150 and the client device 190 are configured as a general purpose computer device. FIG. 2 is a diagram illustrating the hardware configuration of the general purpose computer device according to the present embodiment.

The general purpose computer devices 150 and 190 are configured as a desktop personal computer, a workstation, or the like. A central processing unit (CPU) 12, a northbridge (NB) 14 that connects the CPU 12 with a memory, and a southbridge (SB) 16 are arranged on a board 10 of the general purpose computer devices 150 and 190. The southbridge 16 is connected to the northbridge 14 via a dedicated bus or a PCI bus, to connect the PCI bus, a USB, and the like with an I/O.

A random access memory (RAM) 18 that provides a working area of the CPU 12 and a graphic board 20 that outputs a video signal are connected to the northbridge 14. The graphic board 20 is connected to a display device 50 via a video output interface such as an analog RGB, a High-Definition Multimedia Interface (HDMI) (HDMI and High-Definition Multimedia Interface are registered trademarks or trademarks), and a digital visual interface (DVI).

To the southbridge 16, connected are a peripheral component interconnect (PCI) 22, a LAN port 24, IEEE1394, a USB port 28, an auxiliary storage device 30, an audio input/output 32, and a serial port 34. The auxiliary storage device 30 is a hard disk drive (HDD), a solid state drive (SSD), and the like, and stores an operating system (OS) for controlling a computer device, a computer program of the printer driver, various system information, and various setting information. The LAN port 24 is interface equipment that causes the general purpose computer devices 150 and 190 to be connected to a network in a wired or wireless manner. Input devices such as a keyboard 52 and a mouse 54 are connected to the USB port 28 to provide a user interface for receiving inputs of various instructions from an operator.

The general purpose computer devices 150 and 190 according to the embodiment read out the computer program from the auxiliary storage device 30 and load the computer program into a working space provided by the RAM 18 to implement each functional unit and each process (described later) under the control of the CPU 12. The hardware configuration of the general purpose computer devices 150 and 190 has been described above. The image forming apparatus 110 also has a similar configuration in that it includes hardware in accordance with a specific application such as image forming processing, image reading processing, and facsimile transmission and reception processing, and that it includes hardware such as a CPU and a RAM.

Figure 3:
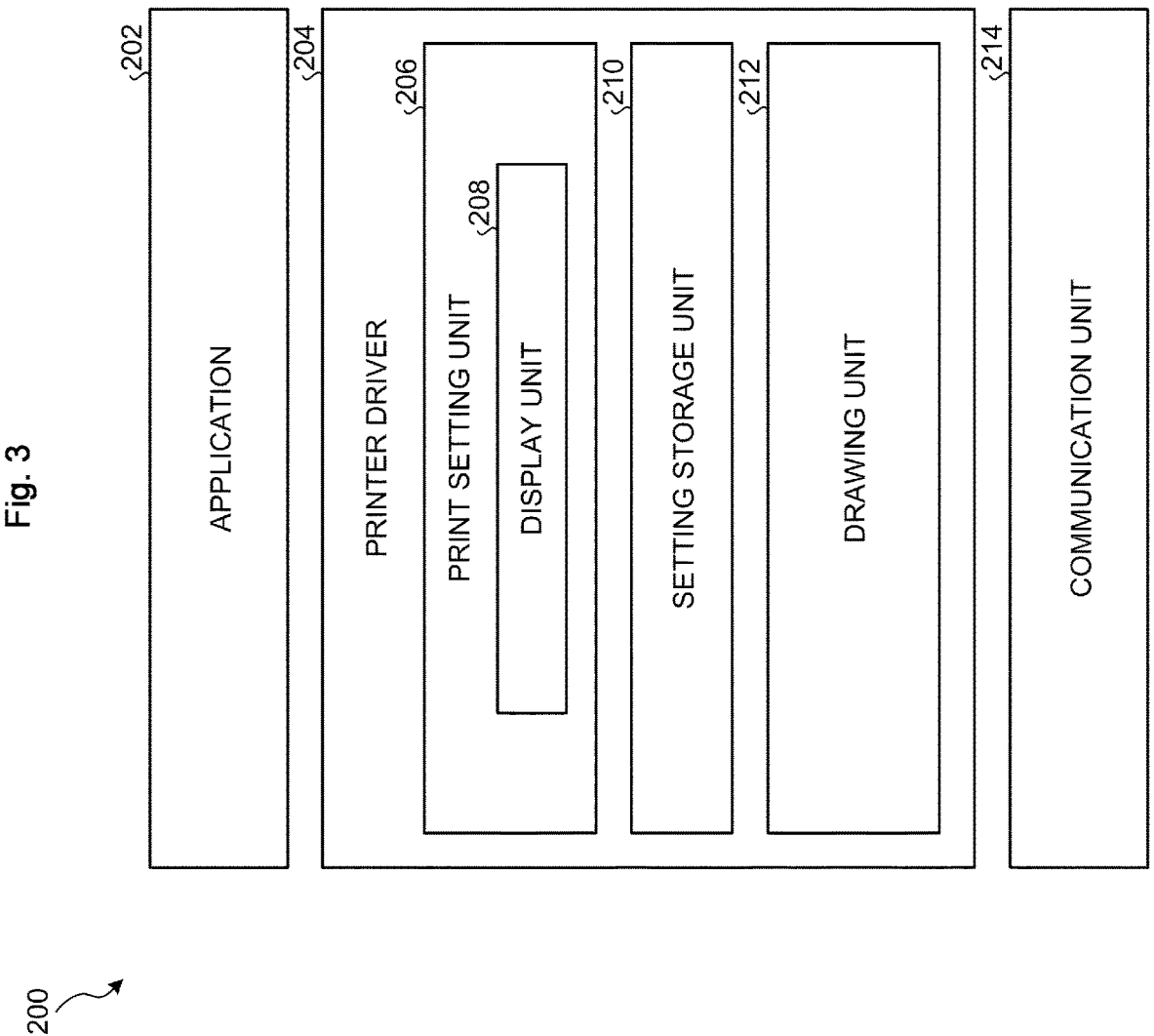
FIG. 3 is a block diagram illustrating a software component operating on a computer device according to the embodiment.

FIG. 3 is a block diagram illustrating a software component that operates on the computer devices 150 and 190 according to the embodiment. FIG. 3 illustrates an application 202, a printer driver 204, and a communication unit 214 as software components 200 on the computer devices 150 and 190.

The embodiment described herein is based on print architecture of Windows (registered trademark). The OS is, for example, Windows (registered trademark) 7, Windows (registered trademark) 8.1, Windows (registered trademark) 10, or the like. The OS provides various components constituting the print architecture. Examples of such components include a graphics device interface (GDI), a print spooler, a print processor, a language monitor, a port monitor, and a port driver.

The application 202 is one of various applications having a printing function such as the software for word processing, spreadsheet, presentation, drawing, photo retouching, browsing, and viewing a document. In response to a user operation, the application 202 calls a user interface for print setting provided by the printer driver 204, and issues a print command based on the print setting to the printer driver 204.

The communication unit 214 includes software for controlling a control device that communicates with the image forming apparatus 110, and transmits and receives data to/from a communication path outside the computer devices 150 and 190.

The printer driver 204 is a driver provided by the computer program according to the embodiment, and installed in the computer devices 150 and 190. The printer driver 204 generates print data in response to the print command from the application 202, and transmits the print data to the image forming apparatus 110 together with the print request. More specifically, the printer driver 204 includes a print setting unit 206, a setting storage unit 210, and a drawing unit 212. The print setting unit 206 and the drawing unit 212 may be provided as different components in the Windows (registered trademark) environment.

The print setting unit 206 includes a display unit 208 that provides a graphical user interface (GUI) for print setting for displaying the print setting to a user and accepting a change of the print setting from the user. In the display unit 208, various settings such as intensive printing, bookbinding, and scaling can be configured along with such settings as the number of copies and duplex printing. The drawing unit 212 receives the print data from the application 202, reflects the print setting therein, draws the print data while supporting the GDI, and gives a command for printer to drawing data to be passed to the print spooler.

Regarding the components described above, the GDI is a subsystem of Windows (registered trademark), and controls display of a drawing object and data transfer to an output device such as the image forming apparatus 110. The print spooler temporarily stores data required for print processing, and manages execution of the print processing in accordance with a processing state. The print processor converts spooled data of a print job into a format to be transmitted by utilizing the drawing unit 212 of the printer driver 204. The language monitor transmits the data received from the print spooler to the port monitor. The port monitor receives data from the language monitor, performs processing based on a communication protocol, and transmits the print data to the port driver. The port driver accesses an input/output port, controls a connection interface (a USB or a network interface card) between the image forming apparatus 110 and the computer devices 150 and 190, and transmits the print data to the image forming apparatus 110.

Especially in the Windows (registered trademark) environment, examples of a method of implementing the print setting via a user interface by the user include a method of utilizing a print setting screen provided by the printer driver 204, and a method of utilizing a print setting screen provided independently by the application 202.

Figure 4:
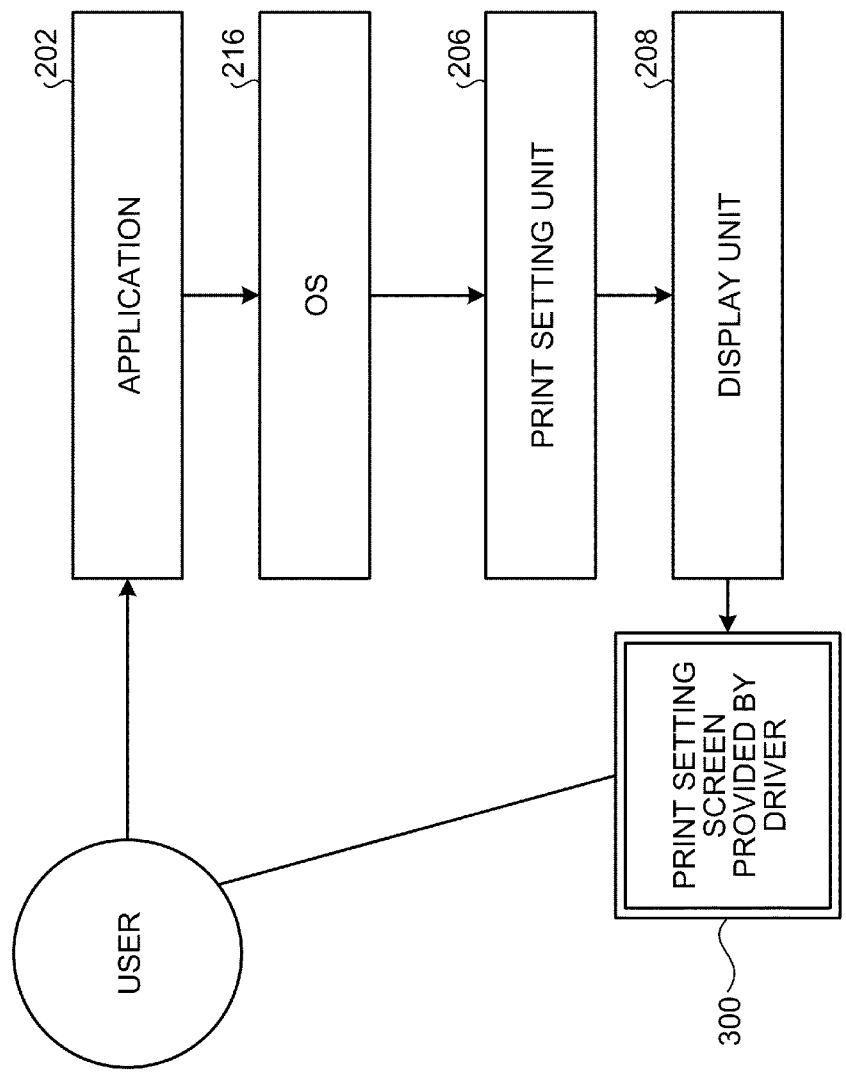
FIG. 4 is a diagram illustrating a flow of print setting information when a print setting screen provided by a printer driver is used.

FIG. 4 is a diagram illustrating a processing procedure of print setting in a case of utilizing a print setting screen 300 provided by the former printer driver. As illustrated in FIG. 4, in response to a user's operation, the application 202 calls the print setting unit 206 of the printer driver 204 via an OS 216. The called print setting unit 206 of the printer driver 204 causes the display unit 208 to display the print setting screen 300. The user performs various print settings on the print setting screen 300. When the print setting screen 300 is closed, the print setting information is passed to the application 202, and the application 202 transmits the print command to the drawing unit 212 of the printer driver 204 together with the print data based on the print setting.

Figure 5:
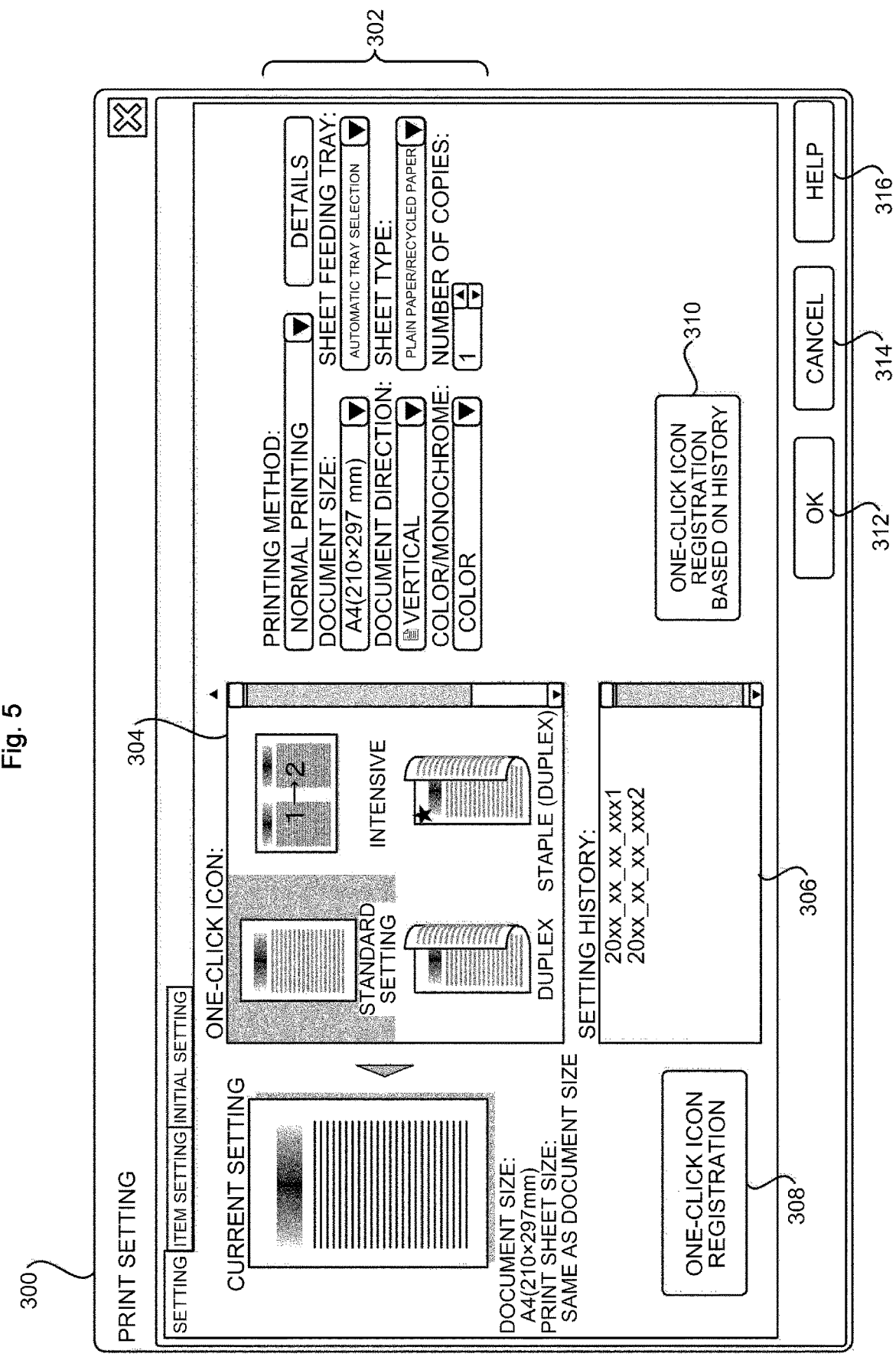
FIG. 5 is a diagram illustrating the print setting screen provided by the printer driver.

FIG. 5 illustrates the print setting screen 300 provided by the printer driver 204. More specifically, the print setting screen 300 is provided by the display unit 208 of the print setting unit 206 illustrated in FIG. 3. The print setting screen 300 includes a GUI component group 302 for receiving set values for various setting items, an OK button 312 for determining setting content, a cancel button 314 for discarding a current print setting and closing the print setting screen 300, and a help button 316. When the OK button 312 is pressed, the print setting is determined to be the current setting.

As illustrated in FIG. 5, a large number of GUI components are arranged in the print setting screen 300 to perform setting by selecting any of a plurality of set values for a plurality of setting items in accordance with capacity of a device type. Although varied depending on the function of the image forming apparatus, the number of functions that can be set in the printer driver is larger than those of typical applications, and there is also a wide variety of prohibitions among the setting items. Thus, it is typically difficult for the user to determine the set value of the setting item.

For simpler and easier setting, in the print setting screen 300 illustrated in FIG. 5, a setting set is provided for specifying a combination of set values that is collectively set for a plurality of setting items when being selected. In the embodiment described herein, the setting set is called by using a one-click icon and a function to be referred to. In the print setting screen 300, a list of one-click icons is displayed in the icon display region 304. In the embodiment described herein, a designation of "one-click icon" is used. Alternatively, in specific implementation, various designations may be used such as an easy setting, a shortcut icon, a favorite, and a user setting.

Due to the function of the one-click icon described above, a burden on the user for performing the print setting can be reduced. For example, with the printer driver 204, the user can register and hold the setting content that has been set as the one-click icon by pressing, for example, a registration button 308. Furthermore, after selecting the one-click icon, the user can change the set values of some setting items, press the registration button 308 for example, and newly register or overwrite and register the one-click icon as a new one-click icon.

There are some setting items the settings of which can be changed a little for each job. Whether to register the settings that are changed a little for each job as an independent one-click icon depends on the user. It is troublesome to register the slightly changed settings as a one-click icon one after another. Such setting content that has been used in the past but remains unregistered is frequently needed to be reused. However, the set values of various setting items are usually held only during the job is processed. After the job is completely processed, the set values cannot neither be utilized, nor registered as a one-click icon.

The printer driver 204 for controlling the image forming apparatus 110 that can perform communication according to the embodiment receives the print setting in the image forming apparatus 110 including a combination of set values for a plurality of setting items, and records a determined print setting in response to determination of the print setting. The printer driver 204 then presents one or more recorded print settings as candidates to be reused.

The candidates for recording and reusing the print setting may be presented in various aspects. According to a first aspect, the determined print setting is recorded as a history. As candidates to be registered as a setting set, one or more print settings that have been used in the past are presented. A print setting to be registered as a one-click icon (setting set) to be reused is designated from among the presented print settings (one-click icon registration based on the history). According to a second aspect, the determined print setting is recorded as a history in the same manner. As candidates to be selected as an output setting to be used, one or more print settings that have been used in the past are presented. The print setting to be reused is selected from among the presented print settings (to be selected from a setting history list). According to a third aspect, the determined print setting is recorded as a new setting set when satisfying a specific condition. As a candidate to be selected as an output setting to be used, the one-click icon (setting set) to be reused is presented (to be selected from a list including the one-click icon registered at the time of printing).

With the above configuration, regarding the print setting in the image forming apparatus 110 that can communicate with the computer devices 150 and 190, the record of the print setting that has been used in the past can be reused to simply and easily perform print setting. With reference to FIGS. 5 to 10, the following describes a print setting history recording function and a print setting reusing function according to the first embodiment.

Figure 6:
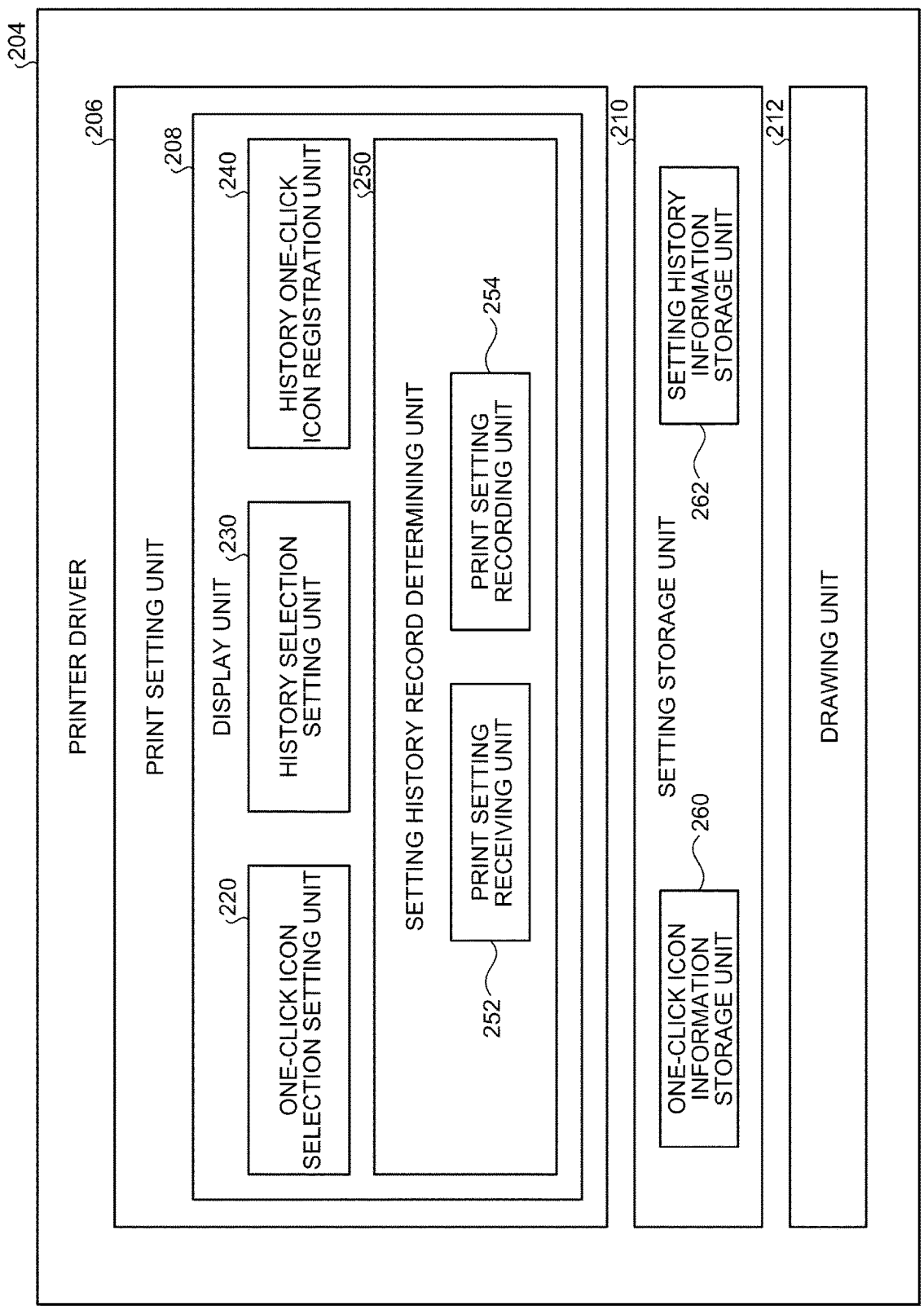
FIG. 6 is a detailed functional block diagram of a printer driver according to a first embodiment.

FIG. 6 illustrates a detailed functional block of the printer driver 204 according to the first embodiment. The display unit 208 of the print setting unit 206 in the printer driver 204 illustrated in FIG. 6 includes a one-click icon selection setting unit 220, a history selection setting unit 230, a history one-click icon registration unit 240, and a setting history record determining unit 250. The setting storage unit 210 includes a one-click icon information storage unit 260 that holds information related to the one-click icon, and a setting history information storage unit 262 that holds history information of the print setting.

The one-click icon selection setting unit 220 displays a list of one-click icons, and collectively designates the set values for a plurality of setting items in accordance with a selected icon. The one-click icon selection setting unit 220 configures a presentation module for presenting the print setting as a candidate to be reused when the used print setting is registered as the one-click icon automatically or through user conversation. In this case, the recorded print setting is presented as a candidate to be selected as the print setting to be used. The icon display region 304 in the print setting screen 300 illustrated in FIG. 5 displays one or more one-click icons in a selectable manner, receives the selection of the one-click icon therefrom to be used as the print setting, and reflects the content of the selected print setting in a state of the GUI component group 302.

The history selection setting unit 230 displays a list of print settings recorded as a history, and collectively designates the set values for the setting items in accordance with the selected item. The history selection setting unit 230 configures a presentation module for presenting the print setting as the candidate to be reused when the used print setting is recorded as a history. In this case, the recorded print setting is presented as a candidate to be selected as an output setting to be used. The print setting screen 300 illustrated in FIG. 5 further includes a history display region 306 for displaying a list of setting history. The history display region 306 is a selection receiving module for displaying the history of one or more print settings in a selectable manner, and receiving selection of the print setting to be used therefrom. Content of the selected print setting is reflected in a state of the GUI component group 302.

The history one-click icon registration unit 240 displays a list of print settings recorded as a history, and registers the one-click icon in accordance with the selected items. The history one-click icon registration unit 240 configures a presentation module for presenting the print setting as a candidate to be registered as a one-click icon to be reused in a case in which the used print setting is recorded as a history. The print setting screen 300 illustrated in FIG. 5 further includes a button 310 for registering the one-click icon based on the history. When the button 310 is pressed, the history of one or more print settings is displayed in a selectable manner, and a registration screen for registering the print setting therefrom as the one-click icon is called. Details about the registration screen will be described later.

The setting history record determining unit 250 receives the print setting, compares a combination of the set values of the setting items included in the print setting with information of the one-click icon that has been already registered, and performs processing of registering the print setting as a history or a one-click icon. The setting history record determining unit 250 includes a print setting receiving unit 252 and a print setting recording unit 254.

The print setting receiving unit 252 is a receiving module for receiving the print setting in the image forming apparatus 110 including the combination of set values for a plurality of setting items. In the first embodiment described herein, the print setting receiving unit 252 receives the print setting from the user via the print setting screen 300 provided by the printer driver.

The print setting recording unit 254 is a recording module for recording the determined output setting in the setting storage unit 210 in response to the determination of the print setting. The recording includes both recording as a history and recording as a one-click icon.

More specifically, the print setting recording unit 254 can record the determined output setting as a setting set of the one-click icon when the combination of the set values for the setting items included in the determined print setting does not correspond to any of the setting sets of the one-click icons registered in advance and automatic registration as a one-click icon is permitted, or when registration is selected through user conversation about whether to register the print setting as a one-click icon after the print setting is determined. When the determined output setting is not recorded as the setting set of the one-click icon, the print setting recording unit 254 can record the determined output setting as a history.

The one-click icon information storage unit 260 stores information regarding one or more one-click icons registered through normal registration processing of the one-click icon or registered by the history one-click icon registration unit 240. The setting history information storage unit 262 stores the history of one or more print settings recorded by the print setting recording unit 254.

In the environment including the client device 190 and the server device 150 described above, selection from the setting history list displayed in the setting history region 306 illustrated in FIG. 5 and selection from the region 304 including the one-click icon registered at the time of printing can be performed by the client device 190 or the server device 150 for each job. One-click icon registration based on the history may be performed by the end user on the client device 190 or collectively performed by the administrator on the server device 150 in performing the job or performing default setting.

The content of information held by the one-click icon information storage unit 260 and the setting history information storage unit 262 may be independently synchronized with each other between the client device 190 and the server device 150, or may be synchronized in one direction. For example, the content held by the setting history information storage unit 262 may be integrated into the server device 150, and the list of one-click icons centrally managed on the server device 150 may be collectively overwritten on a plurality of client devices 190.

Figure 7:
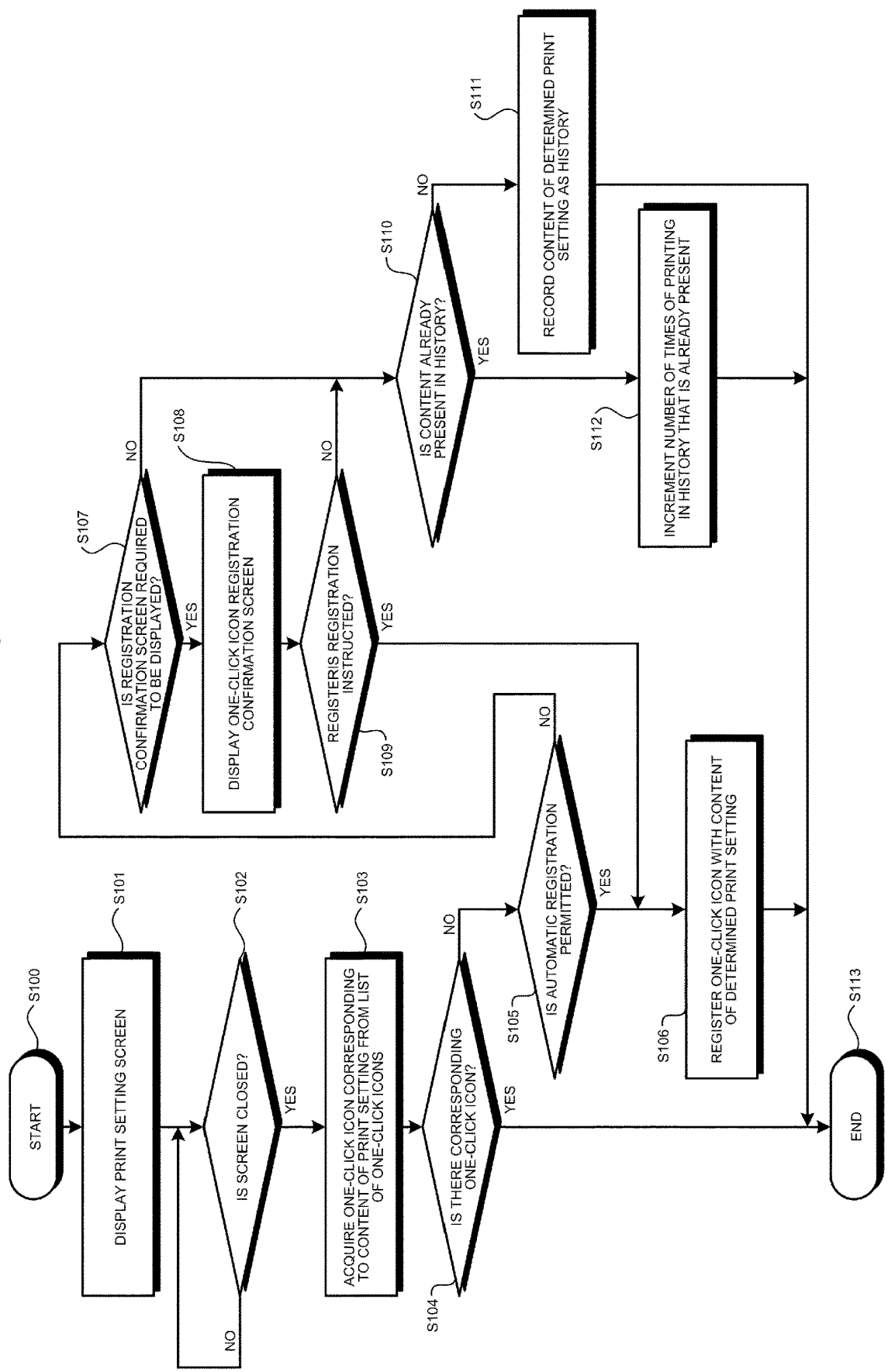
FIG. 7 is a flowchart illustrating processing of recording a print setting history performed by a print setting unit according to the first embodiment.

FIG. 7 is a flowchart illustrating processing of recording a print setting history performed by the print setting unit 206 according to the first embodiment. The processing illustrated in FIG. 7 starts at Step S100 when the print setting screen 300 provided by the printer driver 204 is called from the application 202 or the OS 216, for example.

The print setting screen 300 may be displayed when a property of the printer is called or a detailed setting of the printer is called on the screen provided by the application 202. Alternatively, the print setting screen 300 may be called when a printer icon is right-clicked and the property is selected from a menu on a screen of a printer folder provided by the OS 216.

At Step S101, the print setting unit 206 causes the display unit 208 to display the print setting screen 300. At Step S102, the print setting unit 206 waits closing of the print setting screen 300, and causes Step S102 to be looped until the print setting screen 300 is closed (during a period of NO). If it is determined that the print setting screen 300 is closed (YES) at Step S102, the process proceeds to Step S103. In this case, the print setting receiving unit 252 receives determined printing content. According to the first embodiment described herein, the content of the print setting is determined at the timing when the print setting screen 300 is closed.

At Step S103, the print setting recording unit 254 refers to the one-click icon information storage unit 260, and attempts to acquire a one-click icon corresponding to current setting content from the list of one-click icons. At Step S104, the print setting recording unit 254 determines whether there is a corresponding one-click icon in the list. If it is determined that there is the corresponding one-click icon (YES) at Step S104, the process branches to Step S113 to be ended. This is because such a print setting is already reusable in this case, so that a new one-click icon is neither needed to be registered nor held as a history. In contrast, if it is determined that there is no corresponding one-click icon (NO) at Step S104, the process branches to Step S105.

At Step S105, the print setting recording unit 254 determines whether automatic registration of the one-click icon is permitted. Permission for automatic registration is assumed to be set in advance by the administrator, for example. If it is determined that automatic registration is permitted (YES) at Step S105, the process branches to Step S106. At Step S106, the print setting recording unit 254 records content of the determined print setting in the one-click icon information storage unit 260, registers the one-click icon therein, and ends the process at Step S113.

FIG. 8A and FIG. 8B are diagrams exemplifying a data structure of one-click icon information stored in the one-click icon information storage unit 260. The information held by the one-click icon is a combination of set values for a plurality of setting items. The printer driver 204 usually has a default setting (including a print setting at the time of installation, a standard setting, a factory default, and the like). Thus, each setting set can be represented as difference information with respect to the default setting as illustrated in FIG. 8A. For example, when the icon designates intensive and duplex printing, a difference from the standard setting is "duplex print setting" and "intensive print setting", so that the set values for the print settings of the two items are held.

However, a method of holding the one-click icon information is not limited to a form of holding it as the difference information as described above. As illustrated in FIG. 8B, entire information may be held. For example, even when the icon designates intensive and duplex printing, all the set values for the setting items are held in addition to the settings for the "duplex print setting" and "intensive print setting". Note that setting items are omitted in FIG. 8B as compared with the actual setting items.

Refer to FIG. 7 again. If it is determined that automatic registration is not permitted (NO) at Step S105, the process branches to Step S107. At Step S107, the print setting recording unit 254 determines whether a registration confirmation screen is required to be displayed to prompt the user to register the one-click icon. Whether to display the registration confirmation screen is assumed to be set in advance by the administrator, for example. If it is determined that the registration confirmation screen is required to be displayed (YES) at Step S107, the process branches to Step S108.

At Step S108, the print setting recording unit 254 displays the registration confirmation screen of the one-click icon, and receives an input from the user. At Step S109, the print setting recording unit 254 determines whether registration is instructed. If it is determined that registration is instructed (YES) at Step S109, the process branches to Step S106. At Step S106, the print setting recording unit 254 registers the one-click icon with content of the determined print setting, and ends the process at Step S113.

On the other hand, if it is determined that the registration confirmation screen is not required to be displayed (NO) at Step S107, or if the instruction that indicates no need for the registration is received on the registration confirmation screen (NO) at Step S109, the process branches to Step S110.

At Step S110, the print setting recording unit 254 refers to the setting history information storage unit 262, and determines whether a history of the same setting content is already present. If it is determined that the history of the same setting content is not present (NO) at Step S110, the process branches to Step S111. At Step S111, the print setting recording unit 254 records the current setting content as a history in the setting history information storage unit 262, and ends the process at Step S113.

On the other hand, if it is determined that the history of the same setting content is already present (YES) at Step S110, the process branches to Step S112. At Step S112, the print setting recording unit 254 increments the number of times of use of the history that is already present, and ends the process at Step S113.

FIG. 8C is a diagram exemplifying a data structure of setting history information stored in the setting history information storage unit 262. As illustrated in FIG. 8C, the print setting recording unit 254 records a combination of set values for a plurality of determined setting items in association with identification information for identifying the printer driver (driver name), identification information for identifying the user (user name), identification information for identifying the application (application name), identification information for identifying a file (document name), date and time information (date and time of printing), and the number of times of use (the number of times). A method of holding the combination of set values can be the same as that of the one-click icon information, and the combination of set values can be recorded as difference information with respect to a standard combination or as the total information. The number of times of printing using a combination of the same print settings is held. In this case, items other than the number of times may be the final information.

In the example described above, the combination of set values is recorded in association with all pieces of information in columns illustrated in FIG. 8C. However, the embodiment is not limited thereto. In another embodiment, the combination of set values may be recorded in association with at least one piece of the information described above. A plurality of printer icons may be made for the same printer and displayed in the printer folder, so that identification information for identifying the icon may be associated with the combination of set values together with another piece of information, or in place of another piece of information.

By recording the combination of set values in association with various pieces of information as described above, the print setting to be presented can be selected based on at least one piece of information that is recorded in association with the combination of set values. For example, display or registration can be controlled for each driver, each printer icon, and each user.

With reference to FIG. 5 and FIGS. 9A, 9B, and 9C, the following further describes the print setting reusing function according to the embodiment. As described above, the print setting screen 300 illustrated in FIG. 5 includes the icon display region 304 and the history display region 306. In the icon display region 304, displayed is the one-click icon that is registered automatically or through user conversation by the print setting recording unit 254. In the history display region 306, the history recorded by the print setting recording unit 254 is displayed.

The print setting history may be displayed with a display name that is easily understood by the user when the user refers to the history. In the example of FIG. 5, the history is displayed with date and time of printing. The one-click icon is displayed as an icon, but the embodiment is not limited thereto. The one-click icon may be displayed as a list in another embodiment. The print setting screen 300 called from the application 202 is the same as that called from the printer folder. When the print setting screen 300 is called from the application 202, the application name is included in the history, so that only history information including a corresponding application name may be displayed.

Figure 9A:
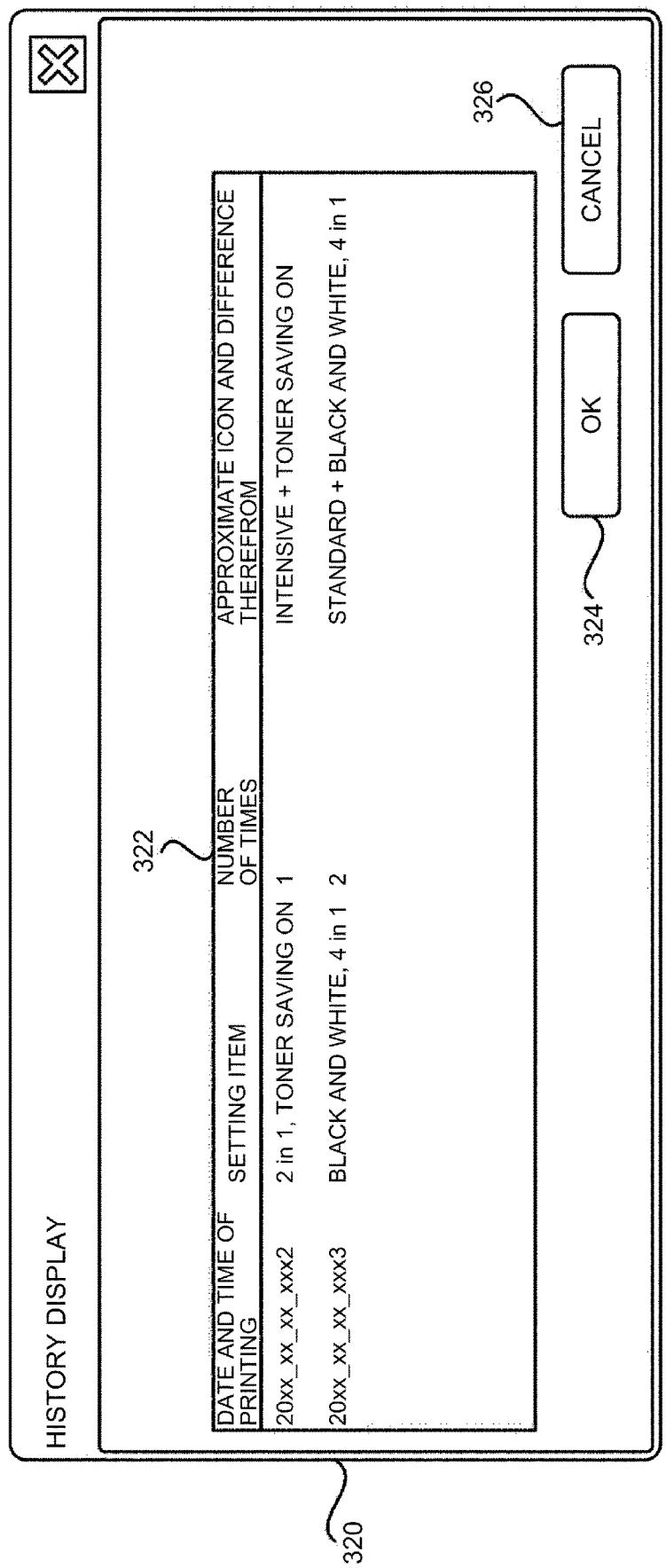
FIG. 9A is a diagram exemplifying a history display screen according to another embodiment displaying a history list for registering a history of combination of set values of setting items as a one-click icon.

FIG. 9A exemplifies a history display screen according to another embodiment displaying a history list. A history list display screen 320 illustrated in FIG. 9A includes a history display region 322 for displaying the history list, an OK button 324, and a cancel button 326. As each item illustrated in the history display region 322, an approximate one-click icon and difference information thereof are displayed. The approximate one-click icon is an icon having the smallest difference from the combination of set values related to the history. Expressing a difference between the currently registered one-click icon and the history, as illustrated in FIG. 9A, can help the user understand the setting content.

Figure 9B:
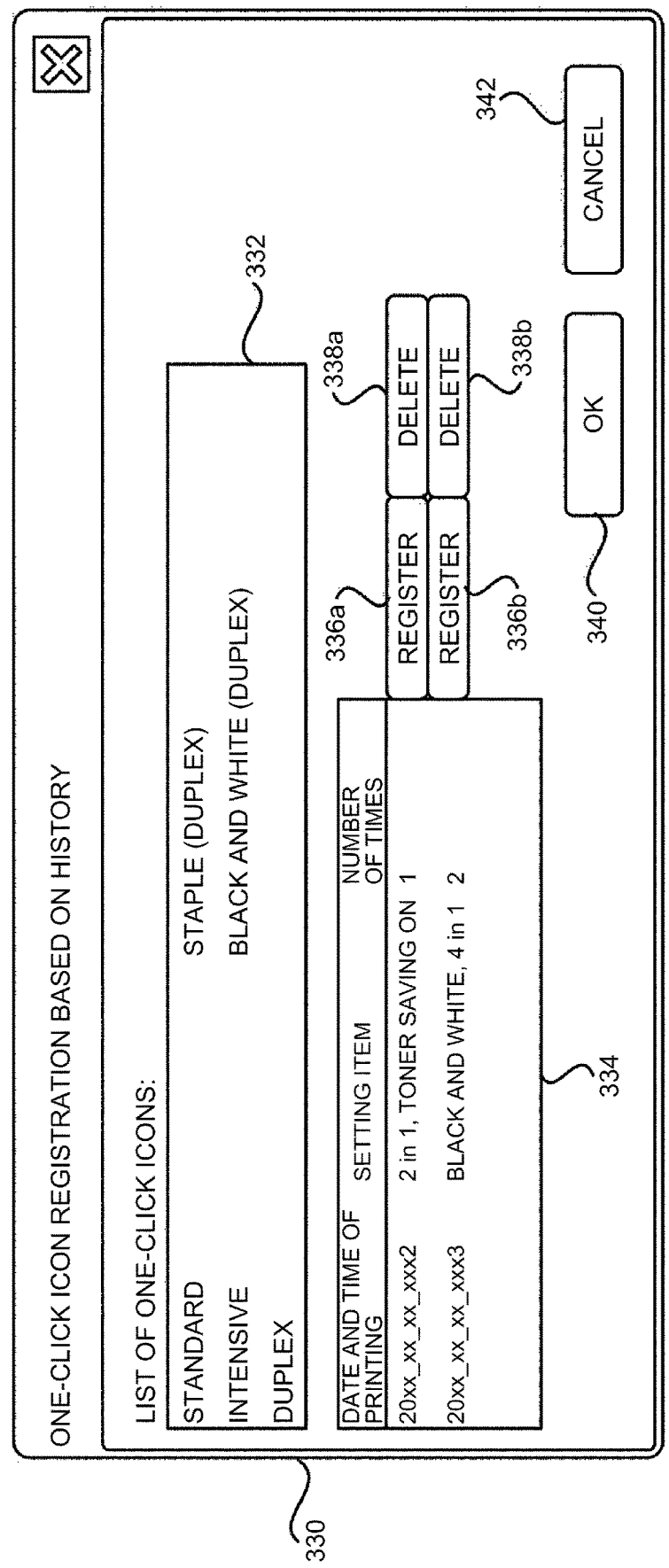
FIG. 9B is a diagram exemplifying a registration screen for registering a history of combination of set values of setting items as a one-click icon.

With reference to FIG. 5 again, the print setting screen 300 further includes the button 310 for registering the one-click icon based on the history. When the registration button 310 is pressed, a one-click icon registration screen illustrated in FIG. 9B is called by the display unit 208. FIG. 9B is a diagram exemplifying a registration screen for registering, as the one-click icon, the history of the combination of set values of print setting items.

A registration screen 330 illustrated in FIG. 9B includes a list display region 332 for displaying the list of one-click icons, and a history display region 334 for displaying the list of setting history. A registration button 336 and a delete button 338 are arranged adjacent to the history display region 334 for each item of each history. When the registration button 336 is pressed, the print setting related to the history of the corresponding item is registered as the one-click icon. When the delete button 338 is pressed, the history of a corresponding item is deleted from the setting history information. As illustrated in FIG. 9B, the user can select the setting set of each history to be the one-click icon or to be deleted from the history.

Figure 9C:
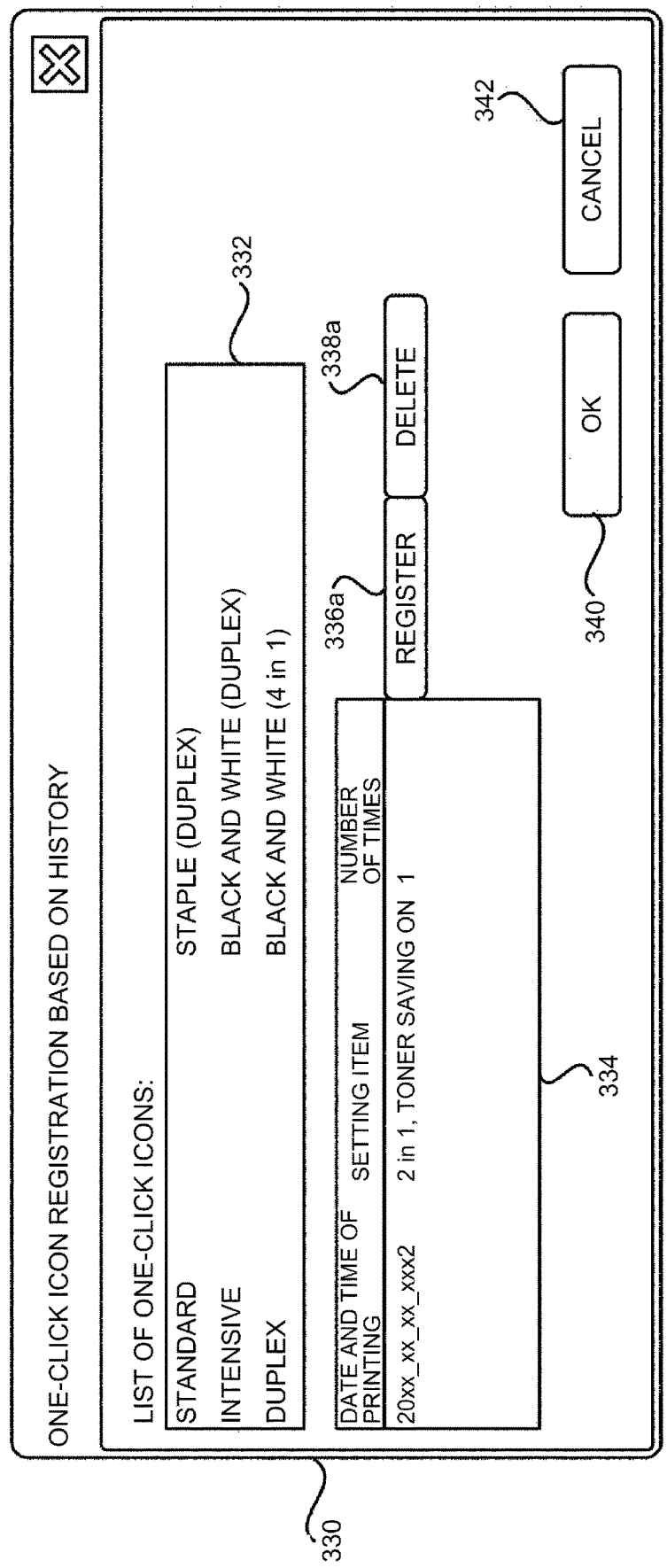
FIG. 9C is a diagram exemplifying a registration screen for registering a history of combination of set values of setting items as a one-click icon.

FIG. 9C is a diagram illustrating the registration screen after one history is registered as the one-click icon. Specifically, illustrated is a state in which setting content of a history represented as "black and white, 4 in 1" is registered as the one-click icon in the screen 330 illustrated in FIG. 9B. As illustrated in FIG. 9C, an item of "black and white (4 in 1)" is newly added to the list display region 332, and a corresponding item is deleted from the history display region 334.

Figure 10:
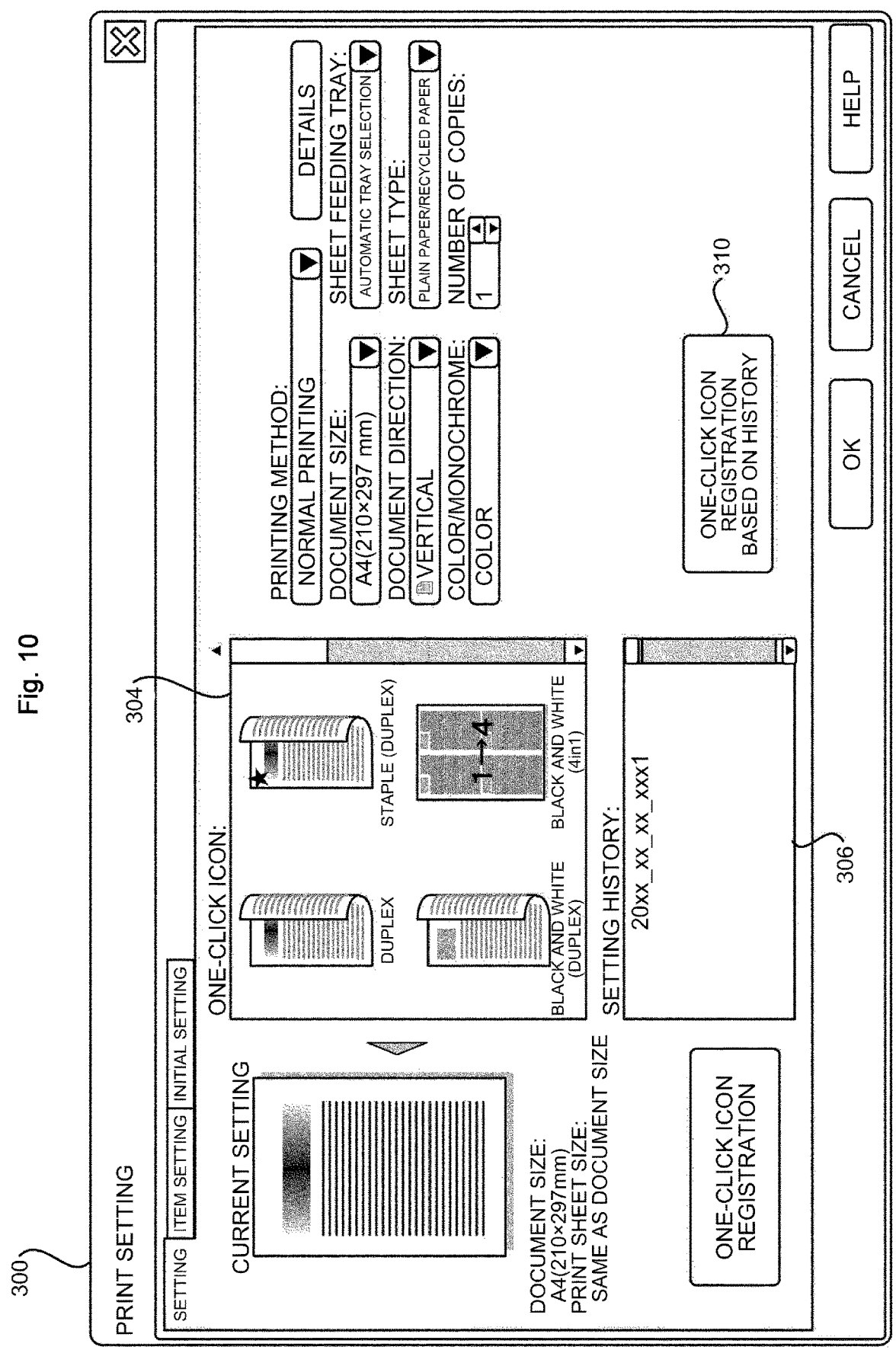
FIG. 10 is a diagram illustrating the print setting screen provided by the printer driver after a one-click icon is newly registered based on the history.

FIG. 10 illustrates the print setting screen 300 after "black and white, 4 in 1" is registered as the one-click icon from the history. As illustrated in FIG. 10, an icon of "black and white (4 in 1)" is newly added to the icon display region 304, and a corresponding item is deleted from the history display region 306.

According to the first embodiment described above, in the computer devices 150 and 190, the print setting can be reused from the record of print settings that have been used in the past as the print setting for the image forming apparatus 110 that can perform communication.

According to the first embodiment described above, the display unit 208 of the print setting unit 206 includes the setting history record determining unit 250 for recording the history, the one-click icon selection setting unit 220 for presenting, as a candidate, the print setting to be reused, the history selection setting unit 230, and the history one-click icon registration unit 240. The following describes a second embodiment in which the functional units 220, 230, and 240 presenting the print setting to be reused are included in the print setting unit 206, and the setting history record determining unit is also included in the drawing unit 212. The following describes the print setting history recording function according to the second embodiment with reference to FIGS. 11A to 14.

As described above, especially in the Windows (registered trademark) environment, examples of a method of implementing the print setting via a user interface by the user include the method of utilizing the print setting screen provided by the printer driver, and the method of utilizing the print setting screen provided by the application.

In the latter method, the print setting can be changed without using the screen provided by the printer driver only for typical setting items included in any printer because the method depends on individual application. In the latter case, the combination of set values of determined setting items cannot be usually registered as the one-click icon because the print setting unit 206 is not called.

FIG. 11A illustrates a procedure of print setting in the former case utilizing the print setting screen 300 provided by the printer driver. On the other hand, FIG. 11B illustrates a procedure of print setting in the latter case utilizing a print setting screen 350 provided by the application 202. Although the print setting unit 206 does not receive the print setting in the latter method, as illustrated in FIGS. 11A and 11B, it remains that the print setting is transmitted to the drawing unit 212 together with the print command in printing in both of the former and the latter case. By arranging the setting history record determining unit in the drawing unit 212, the setting history can be recorded even when the latter method is utilized.

In both of the former and the latter case, even when the combination of set values of setting items is determined, the print job may be canceled depending on a state of the image forming apparatus 110. In this case, a canceled print setting may be recorded as a history or a one-click icon. For example, a printer to which an IP address is assigned is replaced, and the set values that have been used in the past may be disabled.

Thus, it is preferable to register the setting values used in a successful print job as an effective history or an effective one-click icon. By arranging the setting history record determining unit in the drawing unit 212, the print setting used in the print job that has been successfully ended can be registered as a valid history or a valid one-click icon.

Figure 12:
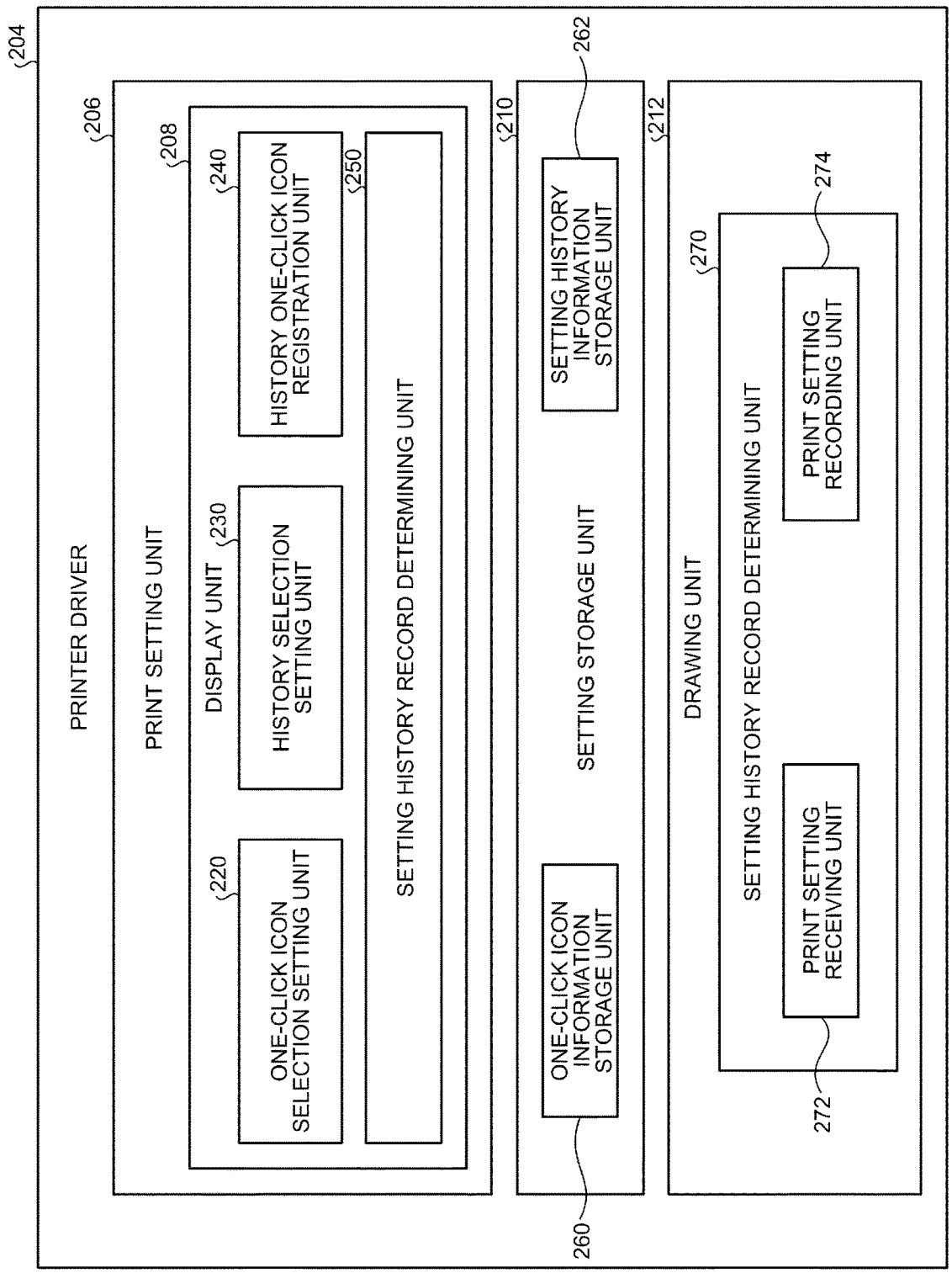
FIG. 12 is a detailed functional block diagram of a printer driver according to a second embodiment.

FIG. 12 illustrates a detailed functional block of the printer driver 204 according to the second embodiment. The display unit 208 of the print setting unit 206 in the printer driver 204 illustrated in FIG. 12 includes, in the same manner as the first embodiment, the one-click icon selection setting unit 220, the history selection setting unit 230, the history one-click icon registration unit 240, and the setting history record determining unit 250. Likewise, the setting storage unit 210 includes the one-click icon information storage unit 260 and the setting history information storage unit 262. The drawing unit 212 in the printer driver 204 illustrated in FIG. 12 further includes a setting history record determining unit 270.

The printer driver 204 according to the second embodiment includes some functions common to those of the first embodiment, so that the following mainly describes differences therebetween. Functional units having the same name are assumed to have substantially the same function unless specifically mentioned.

The setting history record determining unit 270 of the drawing unit 212 has substantially the same function as that of the setting history record determining unit 250 of the print setting unit 206. The setting history record determining unit 270 performs processing of receiving the print setting, comparing the combination of setting items included in the print setting with information of one-click icons that have been already registered, and registering the print setting as a history or a one-click icon when a predetermined condition is satisfied. The setting history record determining unit 270 performs processing in the same manner as the processing after Step S103 in the processing of recording a print setting history according to the first embodiment illustrated in FIG. 7. More specifically, the setting history record determining unit 270 includes a print setting receiving unit 272 and a print setting recording unit 274.

The print setting receiving unit 272 is a receiving module for receiving the print setting. In the second embodiment described herein, the print setting receiving unit 272 can receive, from the application 202, the print setting via the print setting screen 350 provided by the application 202.

The print setting recording unit 274 is a recording module for recording, in response to determination of the print setting, the determined output setting in the setting storage unit 210. The print setting recording unit 254 has the same function as that of the first embodiment. Additionally, the print setting recording unit 254 monitors whether output processing is succeeded, and executes recording when the output processing based on the determined output setting is successfully ended. By arranging the function of recording the history in the drawing unit 212, the combination actually used for printing can be recorded as the history.

According to the first embodiment, the print setting is determined at the timing when the print setting screen 300 is closed. In the second embodiment, the print setting may be determined in response to the issue of a print command to which the print setting is given, and the determination of print settings through user conversation after the print command is issued.

FIGS. 13A and 13B are diagrams for explaining a case in which the print setting may be changed through user conversation after the print command is issued. The drawing unit 212 has a function of converting data into data that can be interpreted by the printer. Additionally, the following two technologies may be applied to the drawing unit 212.

A first technology is a function of determining a final print setting, which is called pop-up, at the time of printing. FIG. 13A exemplifies a screen 360A displayed by the pop-up technology. FIG. 13A exemplifies the screen 360A for setting a password and the like for confidential printing. By displaying such a screen, the user can be forced to change an item for each print job.

A second technology is a function of confirming a final image of the printed material, which is called a preview. This is a mechanism for confirming whether a sheet is not wasted, and whether the printing content is within a sheet. FIG. 13B exemplifies a screen 360B displayed by the preview technology. FIG. 13B displays a screen that performs preview display and accepts a change of the print setting. By displaying such a screen, the user can change the final print setting while confirming the preview.

When the above technology is applied, the combination of set values of setting items can be changed at the timing after the print command is issued, so that the changed content is preferably recorded as a history. A timing of holding the combination of set values of setting items may be a timing after the OK button is pressed on a pop-up screen or a preview screen and execution of the print job is determined.

FIG. 14 is a sequence diagram illustrating processing of recording the print setting history for recording, as a history, the print setting with which printing is successfully performed by the drawing unit 212. In the processing illustrated in FIG. 14, at Step S1, the application (represented as AP in the drawing) 202 calls the CreateDC function, and creates a device context of the printer. A pointer for a DEVMODE structure (print setting) designated with an argument of the CreateDC function is transmitted to the drawing unit 212 as an argument of the DrvEnablePDEV function at Step S1.1. Accordingly, the drawing unit 212 of the printer driver 204 can refer to the print setting information in the DDI function of the drawing unit 212 that is called during a period from the DrvEnablePDEV function at Step S1.1 to the DrvDisablePDEV function at Step S7.1. The print setting information stored in the DEVMODE structure is print setting information generated based on the print setting received from the user via the print setting screen provided by the printer driver or the application. When the pop-up or the preview is not performed thereafter, the received print setting becomes the determined print setting to be held.

At Step S2, the application 202 calls the StartDoc function to start the print job. At Step S3, the application 202 calls the StartPage function to instruct the printer driver 204 to accept data of a new page. The pop-up screen or the preview screen mentioned above may be called before the StartPage function is called. When receiving a change or an addition to the print setting via the pop-up screen or the preview screen, the drawing unit 212 adds the print setting received via the pop-up screen or the preview screen to the print setting received at Step S1, or changes the print setting received at Step S1 based on the received print setting to merge the print setting received at Step S1 with the print setting received via the pop-up screen or the preview screen and holds the merged print setting. In this case, at Step S3 to Step S5 described later, a drawing command is transmitted to the printer using the merged print setting.

At Step S4, the application 202 calls predetermined drawing function, and passes the drawing data to the printer driver 204. Subsequently, commands are executed corresponding to the degree of the drawing content. At Step S5, the application 202 calls the EndPage function, makes a notification that writing corresponding to a page is ended, and makes an instruction to proceed to a new page. Subsequently, the StartPage function and the EndPage function are repeated for the number of printed pages.

At Step S6, the application 202 calls the EndDoc function, and ends the print job. At Step S6.1.1, the drawing unit 212 inquires of the image forming apparatus (printer) 110 whether printing is succeeded. At Step S6.1.2, the setting history record determining unit 270 of the drawing unit 212 writes a combination of set values of setting items as a history when it is not registered as a one-click icon and the print job is successfully ended. A history to be written in a case in which the change or the addition to the print setting is received via the pop-up screen or the preview screen is the print setting described above that has been merged and held. At Step S7, the application 202 calls the DeleteDC function, and deletes the device context generated at Step S1.

According to the second embodiment described above, even when the print setting screen provided by the printer driver is not displayed, the combination of set values of setting items can be held as a history. In addition, the combination of set values of print setting items with which printing can be actually performed by the printer can be held as a history. Furthermore, the print setting performed via the print setting screen provided by the application, which cannot be registered as a one-click icon in the related art, can be registered.

Figure 15:
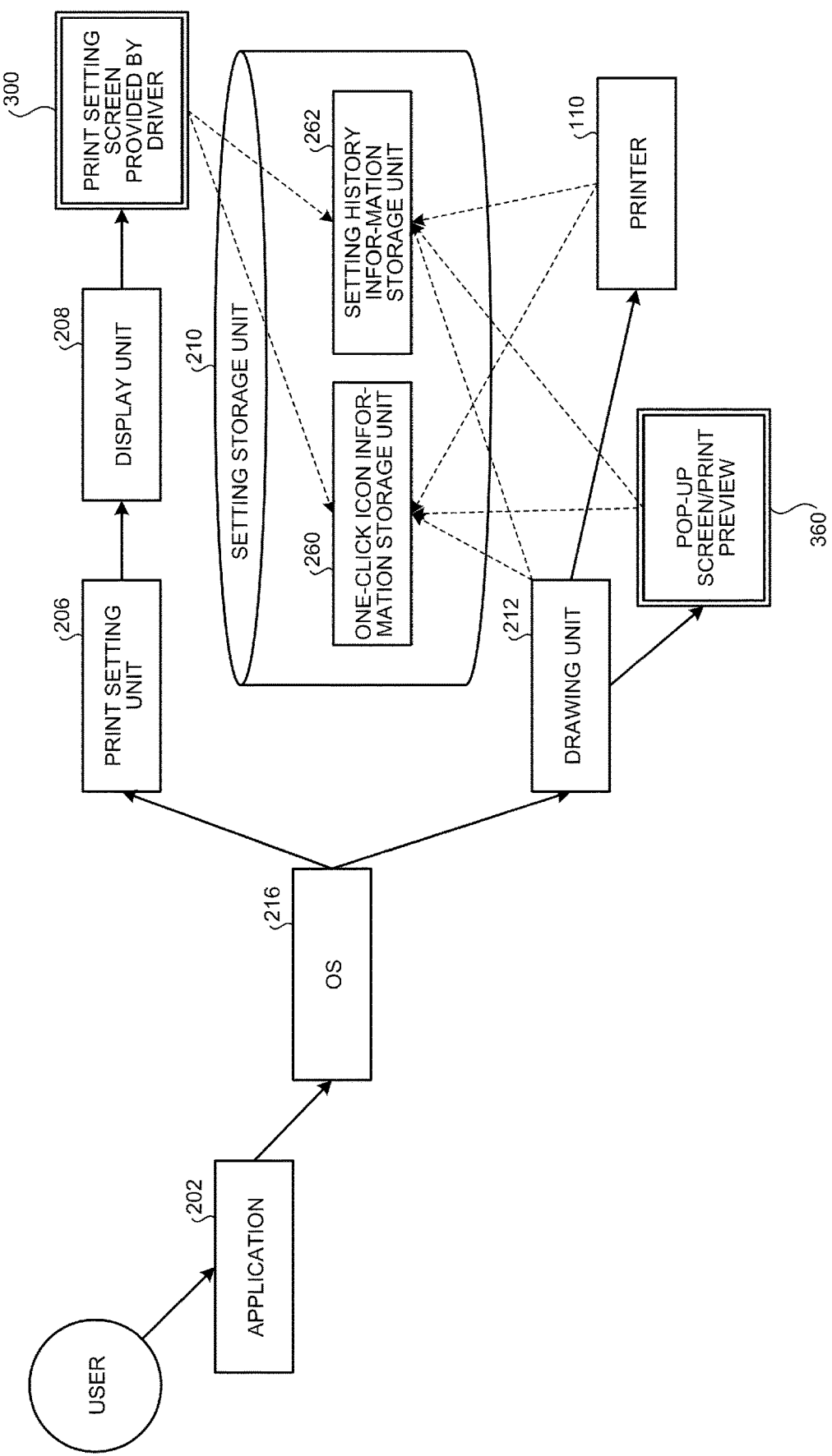
FIG. 15 is a diagram for explaining a print setting history and a record as a one-click icon at the time of print setting and at the time of print execution.

FIG. 15 collectively illustrates the history of print setting and the record as the one-click icon at the time of print setting and at the time of print execution. As illustrated in FIG. 15, when the print setting is performed on the print setting screen 300 provided by the printer driver, the one-click icon or the history is recorded from the print setting unit 206 to the setting storage unit 210 at the time of print setting. Even when the print setting screen 300 is not used, with the print setting at the time of print execution, the one-click icon or the history can be recorded from the drawing unit 212 to the setting storage unit 210. The print setting at the time of print execution may be changed on the pop-up screen or a print preview after the print command is issued. Also in this case, the changed content can be recorded as the one-click icon or the history from the drawing unit 212 to the setting storage unit 210. When it is confirmed that the print job is successfully completed in the image forming apparatus 110, the one-click icon or the history can be recorded from the drawing unit 212 to the setting storage unit 210.

The setting storage unit 210 does not necessarily have to be present in a computer local in which the printer driver 204 operates. As illustrated in FIG. 15, the print setting unit 206 and the drawing unit 212 may be configured to be accessible at the appropriate times.

The setting storage unit 210 can change a storage place thereof according to a specific embodiment. Examples of the setting storage unit 210 include (1) a local storage area provided by a storage device included in or connected to the client device 190 that executes the printer driver 204, (2) a storage area provided by the server device 150 in a point and print environment, (3) a storage area provided by a shared file server and the like that provide a shared storage area, and (4) a storage area provided by an external computer that provides a storage area as a service such as a cloud storage service.

The storage areas (2) and (3) described above are appropriate for a case of sharing the one-click icon in a network and causing the one-click icon to be used for each icon or each user. The storage area (4) is appropriate for a case of using the same one-click icon associated with a user account even when the computer device 190 to be used is changed.

The first and second embodiments have been described above. According to the embodiments described above, provided are a computer program, an information processing device, a setting method, and an information processing system that can reuse the output setting from the record of the output setting that has been used for the output setting in the output device that can communicate with the computer.

In the above description, a preferable print setting has been used to illustrate an output setting. However, the output setting is not limited to the print setting. For example, in another embodiment, the output device may be a facsimile device, and the output setting may be applied to a setting of facsimile transmission. The above embodiments describe a system including the image forming apparatus 110 and the information processing device such as the computer devices 150 and 190 as the information processing system. However, the functions described above can be applied to any system including one or more image forming apparatuses and one or more computer devices.

The functional units described above can be implemented with a computer executable program described in an object-oriented programming language or a legacy programming language such as an assembler, C, C++, C#, and Java (registered trademark), and can be distributed while being stored in a computer-readable recording medium such as a ROM, an EEPROM, an EPROM, a flash memory, a flexible disk, a CD-ROM, a CD-RW, a DVD-ROM, a DVD-RAM, a DVD-RW, a Blu-ray Disc, an SD card, and an MO, or through an electric communication line.

The embodiments of the present invention have been described above. However, the embodiments of the present invention are not limited to the above embodiments, and can be changed within a range that is conceivable by those skilled in the art including another embodiment, addition, modification, and deletion. Any aspect is included in a scope of the present invention so long as it exhibits working and effects of the present invention.

REFERENCE SIGNS LIST

100 Printing system
102 Network
110 Image forming apparatus
150 Server device
190 Client device
200 Software component
202 Application
204 Printer driver
206 Print setting unit
208 Display unit
210 Setting storage unit
212 Drawing unit
214 Communication unit
216 OS
220 One-click icon selection setting unit
230 History selection setting unit
240 History one-click icon registration unit
250, 270 Setting history record determining unit
252, 272 Print setting receiving unit
254, 274 Print setting recording unit
260 One-click icon information storage unit
262 Setting history information storage unit
300 Print setting screen
302 GUI component group
304 Icon display region
306 History display region
308 One-click icon registration button
310 Button for registering one-click icon based on history
312 OK button
314 Cancel button
316 Help button
320 History list display screen
322 History display region
324 OK button
326 Cancel button
330 Registration screen
332 List display region
334 History display region
336 Registration button
338 Delete button
350 Print setting screen
360 Screen
10 Board
12 CPU
14 Northbridge
16 Southbridge
18 RAM
20 Graphic board
22 PCI
24 LAN port
26 IEEE1394 port
28 USB port
30 Auxiliary storage device
32 Audio input/output
34 Serial port
52 Keyboard
54 Mouse

CITATION LIST

Patent Literature

[PTL 1]
Japanese Laid-open Patent Publication No. 2002-182871

The invention claimed is:

1. An information processing device for controlling an output device, the information processing device comprising:
circuitry configured to
store, in a memory, a plurality of setting sets, wherein each setting set of the plurality of setting sets includes a combination of set values collectively set for a plurality of setting items in the setting set, and each set value of each combination of the set values is set when receiving a selection of a setting set of the plurality of setting sets via a screen;
receive a particular output setting, of the output device, that includes a particular combination of set values; and
record, in the memory in response to reception of the particular output setting, the particular output setting, including the particular combination of the set values,
wherein the circuitry is further configured to
record, in the memory, one or more output settings, each including a corresponding combination of the set values, as a history;
present the one or more recorded output settings as candidate output settings, each to be registered as a setting set that specifies the combination of the set values collectively set for the plurality of setting items when selected;
receive the particular output setting to be registered as the setting set from among the candidate output settings; and
record, in the memory, the particular output setting including the particular combination of the set values as part of the history when the circuitry determines that the particular combination of the set values for the setting items included in the particular output setting does not correspond to any of at least one output setting registered in advance that specify a corresponding combination of set values collectively set for the setting items when selected.

2. The information processing device of claim 1, wherein the circuitry is further configured to receive the particular output setting to be registered, based on selection by a user of a displayed icon associated with the particular output setting.

3. The information processing device according to claim 1, wherein the circuitry is further configured to record the particular output setting when automatic registration is permitted or when registration is selected by a user.

4. The information processing device according to claim 1, wherein the circuitry is further configured to:
record the particular combination of set values of the particular output setting as total information in association with at least one of identification information identifying a driver, identification information identifying an icon, identification information identifying a user, identification information identifying an application, identification information identifying a file, a date, and time information, and information including a number of times of use; and select one or more output settings to be presented to the user via the screen, based on at least one piece of the information recorded in association with the particular combination of the set values.

5. The information processing device according to claim 1, wherein the circuitry is further configured to perform printing including print setting and drawing.

6. The information processing device according to claim 1, wherein the circuitry is further configured to:
monitor whether output processing according to the receive particular output setting has succeeded; and
store the particular output setting when the output processing has succeeded and not store the particular output setting when the output processing has not succeeded.

7. The information processing device according to claim 1, wherein the circuitry is further configured to receive the particular output setting by determining the particular output setting in response to a closing of an output setting screen, issue an output command to which the particular output setting is given, or determine the particular output setting through user conversation after the output command is issued.

8. The information processing device according to claim 1, wherein the memory is one of:
a first memory included in or connected to the information processing device;
a second memory connected to the information processing device via a network and providing a computer program to the information processing device;
a third memory providing a shared storage area; and
a fourth memory providing a storage area as a service.

9. A setting method for performing output setting on an output device, the method comprising:
storing, by processing circuitry in a memory, a plurality of setting sets, wherein each setting set of the plurality of setting sets includes a combination of set values collectively set for a plurality of setting items in the setting set, and each set value of each combination of the set values is set when receiving a selection of a setting set of the plurality of setting sets via a screen;
receiving a particular output setting of the output device, the output setting including a particular combination of set values; and
recording, in the memory in response to reception of the particular output setting, the particular output setting, including the particular combination of the set values,
wherein the method further comprises:
recording, in the memory, one or more output settings, each including a corresponding combination of the set values, as a history;
presenting the one or more recorded output settings as candidate output settings, each to be registered as a setting set that specifies the combination of the set values collectively set for the plurality of setting items when selected;
receiving the particular output setting to be registered as the setting set from among the candidate output settings; and
recording, in the memory, the particular output setting including the particular combination of the set values as part of the a history when determining that the particular combination of the set values for the setting items included in the particular output setting does not correspond to any of at least one output setting registered in advance that specify a corresponding combination of set values collectively set for the setting items when selected.

10. The method of claim 9, wherein the step of receiving comprises receiving the particular output setting to be registered, based on selection by a user of a displayed icon associated with the particular output setting.

11. The method of claim 9, further comprising recording the particular output setting when automatic registration is permitted or when registration is selected by a user.

12. The method of claim 9, further comprising:
recording the particular combination of set values of the particular output setting as total information in association with at least one of identification information identifying a driver, identification information identifying an icon, identification information identifying a user, identification information identifying an application, identification information identifying a file, a date, and time information, and information including a number of times of use; and
selecting one or more output settings to be presented to the user via the screen, based on at least one piece of the information recorded in association with the particular combination of the set values.

13. The method of claim 9, further comprising performing printing including print setting and drawing.

14. The method of claim 9, further comprising:
monitoring whether output processing according to the receive particular output setting has succeeded; and
storing the particular output setting when the output processing has succeeded and not store the particular output setting when the output processing has not succeeded.

15. The method of claim 9, further comprising receiving the particular output setting by determining the particular output setting in response to a closing of an output setting screen, issuing an output command to which the particular output setting is given, or determining the particular Output setting through user conversation after the output command is issued.

16. A non-transitory computer-readable medium storing a program that, when executed by processing circuitry, causes the processing circuitry to perform a setting method for performing output setting on an output device, the setting method comprising:
storing, by the processing circuitry in a memory, a plurality of setting sets, wherein each setting set of the plurality of setting sets includes a combination of set values collectively set for a plurality of setting items in the setting set, and each set value of each combination of the set values is set when receiving a selection of a setting set of the plurality of setting sets via a screen;
receiving a particular output setting of the output device, the output setting including a particular combination of set values; and
recording, in the memory in response to reception of the particular output setting, the particular output setting, including the particular combination of the set values,
wherein the method further comprises:
recording, in the memory, one or more output settings, each including a corresponding combination of the set values, as a history;
presenting the one or more recorded output settings as candidate output settings, each to be registered as a setting set that specifies the combination of the set values collectively set for the plurality of setting items when selected;

receiving the particular output setting to be registered as the setting set from among the candidate output settings; and recording, in the memory, the particular output setting including the particular combination of the set values as part of the a history when determining that the particular combination of the set values for the setting items included in the particular output setting does not correspond to any of at least one output setting registered in advance that specify a corresponding combination of set values collectively set for the setting items when selected.

* * * * *